(12) United States Patent
Ryan

(10) Patent No.: US 9,440,216 B2
(45) Date of Patent: Sep. 13, 2016

(54) MINIMAL SURFACE AREA MASS AND HEAT TRANSFER PACKING

(71) Applicant: Robert C. Ryan, Houston, TX (US)

(72) Inventor: Robert C. Ryan, Houston, TX (US)

(73) Assignee: GEOSEPAA LLC, Houston, TX (US)

( * ) Notice: Subject to any disclaimer, the term of this patent is extended or adjusted under 35 U.S.C. 154(b) by 408 days.

(21) Appl. No.: 13/815,687

(22) Filed: Mar. 14, 2013

(65) Prior Publication Data

US 2014/0014493 A1   Jan. 16, 2014

Related U.S. Application Data

(60) Provisional application No. 61/685,309, filed on Mar. 15, 2012.

(51) Int. Cl.
  *B01J 19/30*   (2006.01)
(52) U.S. Cl.
  CPC ....... *B01J 19/30* (2013.01); *B01J 2219/30203* (2013.01); *B01J 2219/30215* (2013.01); *B01J 2219/30234* (2013.01); *B01J 2219/30242* (2013.01); *B01J 2219/30249* (2013.01); *B01J 2219/30265* (2013.01); *B01J 2219/30296* (2013.01); *B01J 2219/30408* (2013.01); *B01J 2219/30416* (2013.01); *B01J 2219/30425* (2013.01); *B01J 2219/30433* (2013.01); *B01J 2219/30466* (2013.01)
(58) Field of Classification Search
  CPC ................... B01D 3/008; B01J 19/30; B01J 2219/30203; B01J 2219/30215; B01J 2219/30234; B01J 2219/30242; B01J 2219/30249; B01J 2219/30265; B01J 2219/30296; B01J 2219/30408; B01J 2219/30416; B01J 2219/304

See application file for complete search history.

(56) References Cited

U.S. PATENT DOCUMENTS

| | | | |
|---|---|---|---|
| 3,340,186 A | 9/1967 | Wehl | |
| 5,132,056 A | 7/1992 | Lockett et al. | |
| 5,453,222 A | 9/1995 | Lee et al. | |
| 5,722,258 A | 3/1998 | Aitken et al. | |
| 6,565,816 B1 | 5/2003 | McNully et al. | |
| 2008/0149299 A1* | 6/2008 | Slaughter | B22F 3/1055 165/10 |

OTHER PUBLICATIONS

Schoen, Alan, Reflections concerning triply-periodic minimal surfaces, 2012, Interface Focus, 2, 658-668.*
Alan H. Shoen, Infinite Periodic Minimal Surfaces Without Self-Intersections, NASA Technical Note D-5541, May 1970, pp. 1-92, TN D-5541, NASA, published Washington, D.C.

* cited by examiner

*Primary Examiner* — Duane Smith
*Assistant Examiner* — Adam W Bergfelder
(74) *Attorney, Agent, or Firm* — Haynes and Boone LLP

(57) ABSTRACT

Mass transfer packing with a minimal surface or a triply periodic minimal surface which enables significantly improved performance for separation and mixing applications particularly with respect to distillation, liquid-liquid contacting, and heat exchange applications.

15 Claims, 32 Drawing Sheets

Schwarz' P Surface [23] and P Surface Fundamental Unit

Koch-Glitsch Super INTALOX® Saddle Random Packing (PRIOR ART) U.S. Pat. No. 6,565,816 B1

Koch-Glitsch INTALOX® Structured Packing (left) and FLEXIPAC® HC® Structured Packing (right)

(PRIOR ART) U.S. Pat. No. 5,132,056

(PRIOR ART) U.S. Pat. No. 5,453,222

Schwarz' P Surface [23] and P Surface Fundamental Unit

Schwarz' D Surface

Schoen's Gyroid (G) Surface and G Surface Mass Transfer Device

Schoen's I-WP Surface [23]

Neovius' C(P) Surface

Primary (left) and Secondary (right) Skeletal D (Diamond) Surface and primary and secondary Skeletal Diamond (D) Surface Mass Transfer/Heat Exchanger (with enclosing chamber removed for easier viewing)

Primary (left) and Secondary (right) Skeletal G (Gyroid) Surface

Primary (left) and Secondary (right) Skeletal I-WP Surface

Primary (left) and Secondary (right) Skeletal Neovius C(P) Surface

Schwarz's CLP Surface

Schoen's F-RD Surface

Fischer-Koch S Surface

Schoen's Batwing Surface

Brakke's Pseudo-Batwing Surface

Lord and Mackay P3a Surface

Schoen's I-6 Surface

Schoen's I-8 Surface

Schoen's I-9 Surface

Schoen's F-RD(r) Surface

Schoen's I-WP(r) Surface

Fischer-Koch C(Y) Surface

Four-Ended Surface and Four-Ended Random Packing

Heat Integrated Distillation Column and Schwarz's D Surface Mass Transfer/Heat Exchanger
(with enclosed column removed for easier viewing)

Schwarz's D Surface Absorber Column and (with enclosing column removed for easier viewing) and primary and secondary Skeletal Diamond (D) Surface Heat Exchanger Schoen G Surface, primary and secondary Skeletal Gyroid (G) graphs, and combination of G surface with primary and secondary Skeletal graphs Helicoid Direct Contact Membrane Distillation Schwarz D Surface Direct Contact Membrane Distillation

MINIMAL SURFACE AREA MASS AND HEAT TRANSFER PACKING

CROSS REFERENCE TO RELATED APPLICATION

This application claims priority to provisional application for patent No. 61/685,309, filed Mar. 15, 2012, and incorporated herein by reference in its entirety.

BACKGROUND ART

Mass transfer is the transfer of mass from a relatively high concentration to a relatively low concentration. Typically the term is used to describe physical processes that involve molecular and convective transport of atoms and molecules within physical systems. Mass transfer of fluids, both gases and liquids, is a key requirement in a large number of industries such as chemical, petroleum refining, gas processing, pharmaceutical, and food and includes both separation and mixing. The typical separation techniques include distillation, high pressure absorption, and extractions (including supercritical fluid extractions). For mixing applications there are many processes where gas-gas, gas-liquid and liquid-liquid contacting is important. Gas must be efficiently and effectively contacted with the liquid to provide mass transfer (absorption or desorption; absorption of gas into a liquid to produce a chemical reaction is often a particularly important function). For both separation and mixing a key component for this mass transfer operation is to have an effective mass transfer device. The typical devices include trays, random packing and structured packing.

For random packing, e.g. FIG. 1, the shapes that are typically used include a saddle such as Koch-Glitsch Super INTALOX® Saddle and ring styles such as Sulzer Nutter Ring. Their respective shapes are designed to minimize liquid holdup and pressure drop. The external geometry prevents the column packing from interlocking or entangling, ensuring the randomness and optimum surface area within the packed bed, while the internal fingers, arches and vanes promote optimum interfacial gas/liquid contact with minimal drag or hold-up. Energy consumption is reduced, due to lower reflux ratios. In high pressure operations and in situations where fouling is a concern, the use of random packings is usually preferred. Random packings are also usually preferred for absorption systems.

Modern structured packings, e.g. FIG. 2, take the form of corrugated sheets (mostly metallic) arranged in an orderly manner to allow downward liquid flow and upward gas flow. Advances have been made both in structured packing design with products such as: Koch-Glitsch HC, Montz M and MN, and Sulzer MellapakPlus series. Corrugated structured packings are essentially film flow type devices and they work efficiently as long as a continuous film is held by surface tension. The intersections of the corrugated sheets create mixing points for the liquid and vapor phases. Significant effort has focused on trying to minimize pressure drop and thereby increase capacity while maintaining separation efficiency. Various optimizations, such as changing the corrugation angle and inclination angle, have been based on metal sheets. The basic design of packing requires that the elements be rotated from one element to the next to provide additional mixing but this rotation from one element to the next results in additional pressure drop.

There are limits to the current separation structures of trays, corrugated sheets, saddles and rings. These structures all require flow transition from one packing element to the next, e.g. from one tray to another, from one random packing element to the next or one structured packing layer to another. For example in the case of structured packing the overall pressure drop comprises three major components: gas liquid interaction at the interface along the flow channels, flow direction change losses with associated entrance effects at the transitions between packing layers and, very influential but often ignored, the gas-gas interaction at the plane separating crossing gas flow channels. To overcome these limitations a structure that minimizes or eliminates these transitions is needed.

In addition to improvements in vapor/liquid contactors there is a further need to develop energy efficient distillation columns. One concept in saving energy is a diabatic distillation column. In this case the reboiler and condenser of a conventional column are replaced by a reboiler and condenser that are integrated within the column. This allows for the gradual addition of heat to the stripping section and removal of heat from the rectifying section. However, implementation is difficult due to large capital costs and complex tray design.

Another promising design is one that combines heat and mass transfer. The basic concept is to combine vapor compression with a diabatic distillation. Current designs involve the use of alternate passages each filled with structured packing or a shell within a shell using trays as separation devices. However, heat and mass transfer combination distillation can be significantly improved if the packing and heat exchangers are the same.

Therefore it is an object of this invention to provide an improved mass transfer capability, particularly with respect to distillation, absorption, and liquid-liquid contacting applications, based on packing with minimal surface area design.

SUMMARY OF THE INVENTION

The present invention is useful in conjunction with various embodiments, methods, and types of apparatus (systems) that effect mass transfer. In certain embodiments an apparatus is provided composed of an outside shell with inlets and outlets for fluids, the shell having a mass transfer device with a minimal surface area design. Minimal surface area structures are suitable for carrying out distillations and absorption separations and methods to accomplish these operations are provided. Primary and secondary skeletal graphs derived from triply periodic minimal surfaces are also suitable for carrying out distillations and mixing and methods to accomplish these operations are provided. A method for carrying out membrane distillations with a double helicoid composed of a permeable material (often a plastic material such as polyethylene) is provided. A method of distillation combining heat and mass transfer using skeletal graphs of triply periodic minimal surfaces composed of a permeable material is provided.

It is an object of this invention to provide an improved random packing mass transfer device based on a minimal surface design. It is a further object of this invention to provide an improved method of distillation based on random packing with a minimal surface design. It is a further object of this invention to provide an improved method of absorption based on random packing with a minimal surface design. It is a further object of this invention to provide an improved method of distillation based on random packing with a minimal surface design wherein greater than 10% of the surface has been removed. It is a further object of this invention to provide an improved method of absorption based on random packing with a minimal surface design wherein greater than 10% of the surface has been removed.

To further understand the present invention and its applications, certain definitions of terms will prove helpful:

As used herein the term "mass transfer" means physical processes that involve molecular and convective transport of atoms and molecules within physical systems. Mass transfer of fluids can involve both gases and liquids.

As used herein the term "Lagrange's equation" means (1)

$$(1+h_v^2)h_{uu} - 2h_u h_v h_{uv} + (1+h_u^2)h_{vv} = 0 \quad (1)$$

As used herein the term "Weierstrass Formula" (also known as the Weierstrass-Enneper parameterization) means a parameterization of a minimal surface in terms of two functions f(z); g(z), Equation 2:

$$\begin{bmatrix} x(r,\phi) \\ y(r,\phi) \\ z(r,\phi) \end{bmatrix} = R \int \begin{bmatrix} f(1-g^2) \\ if(1+g^2) \\ 2fg \end{bmatrix} dz \quad (2)$$

where $z=re^{i\theta}$ and R[z] is the real part of z.

As used herein the term "helicoid" means a minimal surface having a circular helix as a boundary and is generated by simultaneously rotating and translating a line at constant speed about an axis to which the line is perpendicular. The equation generating this surface can be given in parametric form, Equation 3:

$$x = u \cos v; y = \sin v; z = cv \quad (3)$$

As used herein the term "minimal surface" means that the mean curvature of the minimal surface is zero at each point on the surface.

As used herein the term "mean curvature" (H) means the average of the two principal curvatures.

As used herein, the term "principal curvatures" means the maximum and minimum of the normal curvature, $k_1$ and $k_2$ at a given point on a surface.

As used herein, the term "structured packing" means packing wherein individual members have specific orientation relative to each other and to the column axis. An example is the structured packing disclosed in U.S. Pat. No. 5,132,056 to Lockett, which is incorporated by reference herein in its entirety.

As used herein, the term "random packing" means packing wherein individual members do not have specific orientation relative to each other or to the column axis. An example is the random packing disclosed in U.S. Pat. No. 6,565,816 B1 to McNulty, which is incorporated by reference herein in its entirety.

The term, "column", as used in the present specification and claims means a distillation or fractionation column or zone, i.e., a contacting column or zone wherein liquid and vapor phases are countercurrrently contacted to effect separation of a fluid mixture, as for example, by contacting of the vapor and liquid phases on a series of vertically spaced trays or plates mounted within the column and/or on packing elements. For a further discussion of distillation columns see the Chemical Engineers' Handbook, Fifth Edition, Edited by R. H. Perry and C. Chilton, McGraw-Hill Book Company, New York, Section 13, "Distillation" B. D. Smith et al, page 13-3; *The Continuous Distillation Process*, incorporated by reference herein.

As used herein, the term "HETP" (Height Equivalent to a Theoretical Plate) means the height of packing over which a composition change is achieved which is equivalent to the composition change achieved by a theoretical plate.

As used herein, the term "theoretical plate" means a contact process between vapor and liquid such that the exiting vapor and liquid streams are in equilibrium.

As used herein, the term "crystallographic space group" means that for a three-dimensional object the object's symmetry can be described as one of the two hundred and thirty space groups.

As used herein, the term "triply periodic minimal surface" means that the minimal surface is comprised of a unit that repeats in three dimensions, sometimes referred to as infinitely extending, that has one of the two-hundred thirty crystallographic space groups as its symmetry group and, if it has no self-intersections, it partitions space into two labyrinthine regions. Its topology is characterized by two interpenetrating networks—its "labyrinth graphs".

As used herein, the term "3D printing" is a form of additive manufacturing technology where a three dimensional object is created by successive layers of material. The 3D printing method is preferred herein for forming complex minimal surface areas.

As used herein, the term "additive manufacturing" (AM) is a process of joining materials to make objects from 3D model data, usually layer upon layer, as opposed to subtractive manufacturing methodologies. Synonyms include additive fabrication, additive processes, additive techniques, additive layer manufacturing, layer manufacturing, and freeform fabrication.

As used herein, the term "selective laser sintering" (SLS) is a process whereby layer by layer of fine powder is applied and a laser hardens the part of each layer that will become the final structure.

As used herein, the term "photopolymerization" is a process whereby polymerization of acrylic and epoxy monomers or prepolymers is carried out by activating a photoactivate radical or cationic species with a light source.

As used herein, the term "computer aided design" (CAD) means the use of computer technology for the design of objects, real and virtual. The output of CAD can convey symbolic information such as materials, processes, dimensions, and tolerances, according to application-specific conventions.

As used herein, the term "computer aided manufacture" (CAM) means the use of computer software, typically CAD output, to control machine tools and related machinery in the manufacturing of work pieces. This is particularly useful in forming minimal surface areas through 3D printing.

As used herein, the term "skeletal graph" means the end result of expanding or shrinking a surface along the direction of its normal vectors, while avoiding any pinching off that would change the topology of the surface, until all that remains is a connected graph of arcs and nodes.

As used herein, the term "flooding" means that when the relative flow rates of the vapor and liquid are such that the drag force of the up flowing vapor is greater than or equal to the gravity force acting on the liquid; then, the liquid stops flowing down the column, i.e., in the direction of the gravitational force.

As used herein, the term "plastic" means a synthetic or semi-synthetic organic solid used in the manufacture of industrial products.

As used herein, the term "level set" means a real-valued function $f$ of n variables of the form:

$$\{(x_1, \ldots, x_n) | f(x_1, \ldots, x_n) = c\}$$

where c is a constant. That is, it is the set where the function takes on a given constant value and when the number of variables is three this is a level surface.

As used herein the "level set approximation for the Schwarz P minimal surface" is given by:

$$\cos 2\pi x + \cos 2\pi y + \cos 2\pi z = 0 \tag{4}$$

As used herein the "level set approximation for the iWP minimal surface" is given by:

$$\cos 2\pi x \cdot \cos 2\pi y + \cos 2\pi y \cdot \cos 2\pi z + \cos 2\pi z \cdot \cos 2\pi x = -0.250 \tag{5}$$

As used herein the "level set approximation for the Neovius C(P) minimal surface" is given by:

$$0.6(\cos 2\pi x + \cos 2\pi y + \cos 2\pi z) - 0.4(\cos 2\pi x \cdot \cos 2\pi y \cdot \cos 2\pi z) = -0.3 \tag{6}$$

As used herein the "level set approximation for the Schoen gyroid (G) minimal surface" is given by:

$$\sin 2\pi y \cdot \cos 2\pi z + \sin 2\pi z \cdot \cos 2\pi x + \sin 2\pi x \cdot \cos 2\pi y = 0 \tag{8}$$

As used herein the "level set approximation for the P skeletal minimal surface" is given by:

$$10 \cdot (\cos x + \cos y + \cos z) - 5.1 \cdot (\cos x \cdot \cos y + \cos y \cdot \cos z + \cos z \cdot \cos x) = 14.6 \tag{10}$$

As used herein the "level set approximation for the iWP skeletal minimal surface" is given by:

$$10.0 \cdot (\cos x \cdot \cos y + \cos y \cdot \cos z + \cos z \cdot \cos x) - 5.0 \cdot (\cos 2x + \cos 2y + \cos 2z) = 14$$

As used herein, the term "acrylate ion" ($CH_2=CHCOO^-$) means the ion of acrylic acid.

As used herein, the term "electroless nickel plating" (EN) means an auto-catalytic chemical technique used to deposit a layer of nickel-phosphorus or nickel-boride alloy on a solid work piece, such as those comprising metal or plastic.

As used herein, the term "membrane distillation" is a thermally driven separation process in which separation is enabled due to phase change. A hydrophobic membrane displays a barrier for the liquid phase, allowing the vapor phase to pass through the membrane's pores. The driving force of the process is given by a partial vapor pressure difference commonly triggered by a temperature difference.

As used herein, the term "energy recovery ventilator" (ERV) means a type of air-to-air heat exchanger that not only transfers sensible heat but also latent heat. Since both temperature and moisture are transferred, ERVs can be considered total enthalpic devices (total energy devices).

As used herein, the term "double helicoid" means two helicoids that are intertwined. Such a structure can be made with 3D printing techniques although one can visualize it as starting with a helicoid made of a suitable substance such as wax, coating the helicoid with another suitable substance such as a polymer, and then removing the original helicoid such as by heating to dissolve the wax.

DETAILED DESCRIPTION

Figure 1:
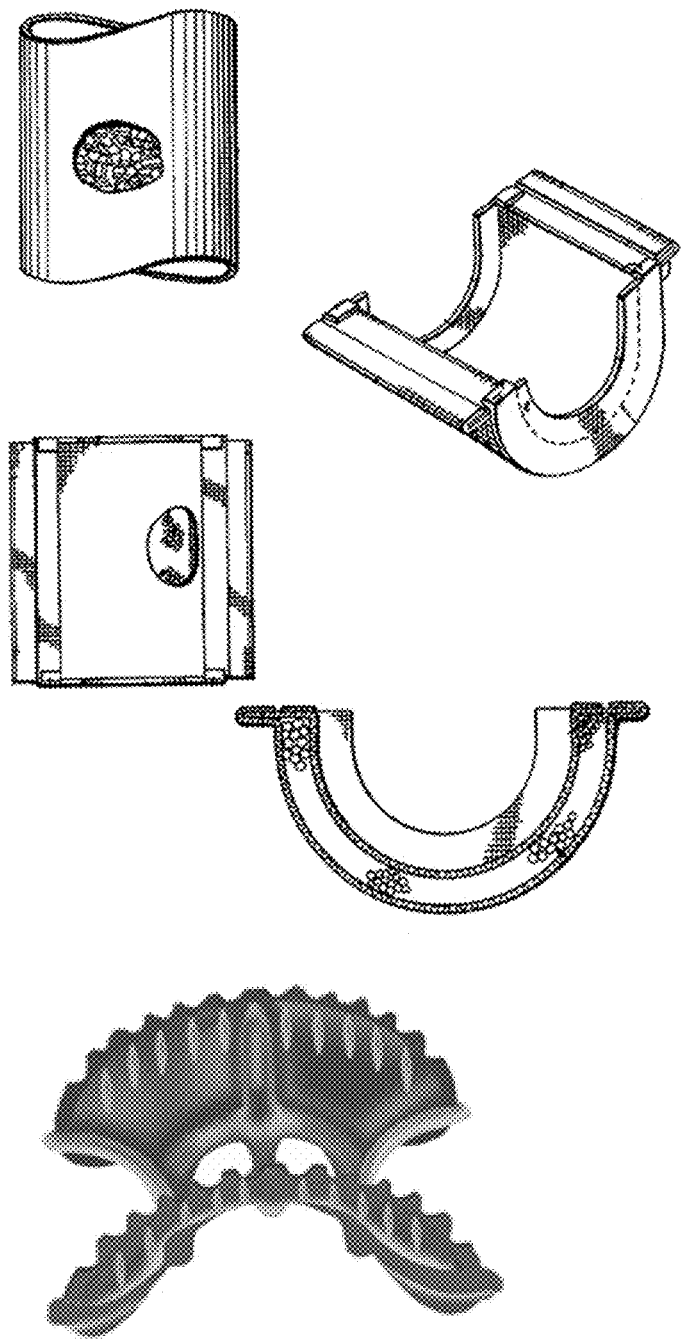
FIG. 1 is a view of figures from (PRIOR ART) U.S. Pat. No. 6,565,816 B1 and the Koch-Glitsch Super INTALOX® Saddle Random Packing.
Figure 2:
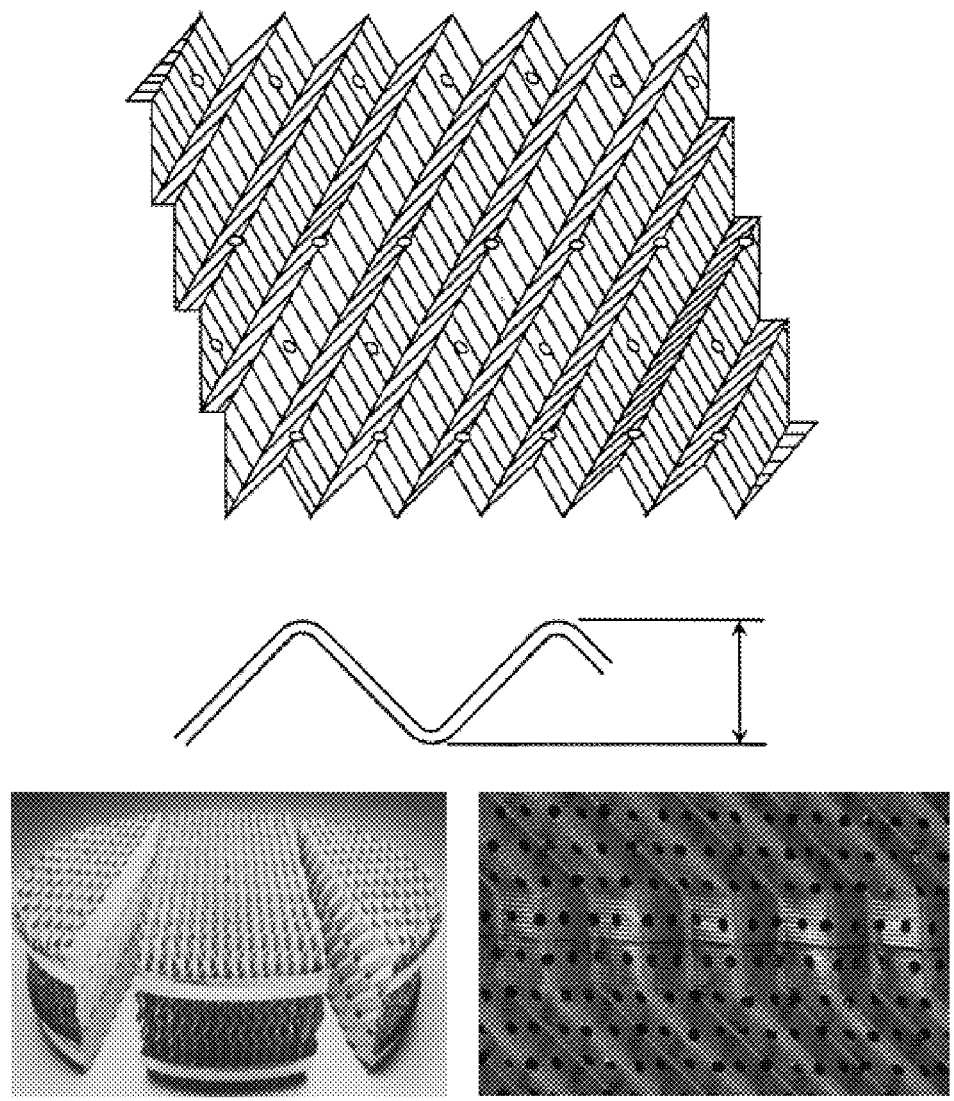
FIG. 2 is a view of figures from (PRIOR ART) U.S. Pat. No. 5,132,056 and Koch-Glitsch INTALOX® Structured Packing (left) and FLEXIPAC® HC® Structured Packing (right)
Figure 3:
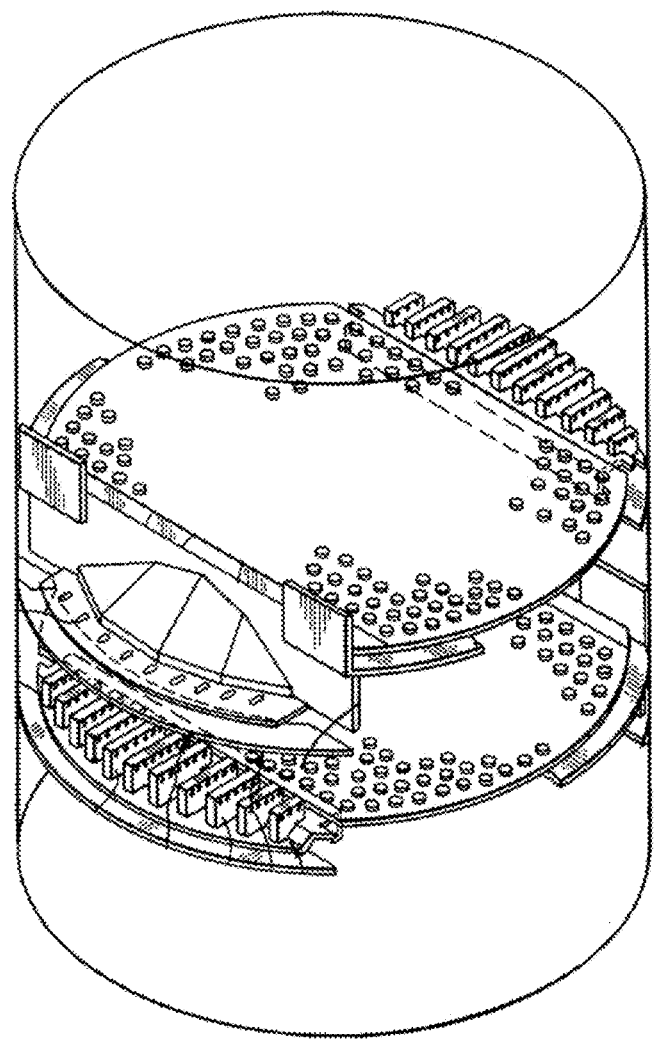
FIG. 3 is a view of FIG. 3 from (PRIOR ART) U.S. Pat. No. 5,453,222.

This invention comprises, in general, a change in the basic design of mass transfer devices. For mass transfer devices or "packing", as it is called, the change is from the commercially available corrugated sheets of metal arranged in a crisscrossing relationship to create flow channels for the vapor phase used in structured packing as illustrated in FIG. 2 and the saddle structures for random packing as illustrated in FIG. 1 to one based on minimal surface area packing. The improvement enables one to carry out mass transfer applications such as distillation, liquid-gas absorption, liquid-liquid extraction, and liquid-liquid reactions with higher efficiency. Efficiency is typically measured in terms of an HETP with lower values indicating a more efficient system.

A minimal surface is one that locally minimizes its area and this is equivalent to having a mean curvature of zero. A minimal surface parameterized as x=(u, v, h(u,v)) satisfies Lagrange's equation. To represent such a minimal surface the Weierstrass Formula is typically used. As an example of a physical implementation, physical models of area-minimizing minimal surfaces can be made by dipping a wire frame into a soap solution, forming a soap film, the soap film being a minimal surface whose boundary is the wire frame. Surface tension, which measures the energy needed to create a surface, acts as a physical surface minimizer: since energy is proportional to the soap film surface, the film deforms to minimize its surface and, thus its energy. This least area property of minimal surfaces has been useful in architecture particularly for light roof construction. With the same boundary, minimal surface is the surface of the least area and so its weight is less and the amount of material is reduced and this is accomplished while maintaining strength. The present invention uses minimal surface areas for mass transfer applications.

The minimization of area within the confines of a given boundary allows for very thin yet strong structures and these properties are important in mass transfer applications where thin interfaces allow for more cost effective mass transfer due to lower material costs for the transfer device. Manufacturing of these structures can be accomplished by using CAM and 3D printing techniques such as selective laser sintering and photopolymerization and can be designed using CAD techniques. The materials that can be used for mass transfer devices include but are not limited to metals, polymers including polymethyl methacrylate and polyacrylonitrile, ceramics, glass, and carbon. The thickness and materials of construction will be determined by the particular mass transfer application. Due to its minimal surface area design the thickness can be in the nanometer range. One method to accomplish this is to use an electroless nickel plating technique where a polymer substrate is first formed, subsequently coated with a metal, and then the polymer is removed. This method is capable of preparing a surface with a thickness of approximately 150 nanometers. For comparison current structured packings have thicknesses of approximately 0.1 mm (101,600 nanometers) to 0.2 mm (203,200 nanometers).

Figure 27:
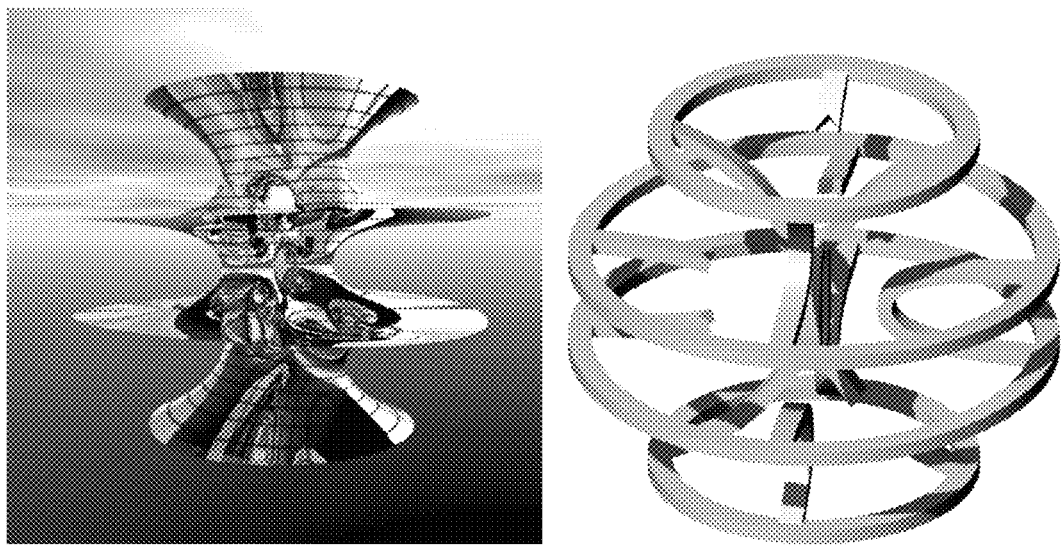
FIG. 27 is a view of a Four-Ended Surface and Four-Ended Random Packing.

Minimal surfaces can be used as random packing elements for distillation and absorption applications. Depending on the application the minimal surface structure can be modified by removing portions of the surface to increase the overall porosity while maintaining strength such as shown in FIG. 27. Additional minimal surfaces that may be used in the present invention are Enneper's surfaces, Chen-Gackstatter Thayer surfaces, catenoid surfaces, Costa-Hoffman-Meeks surface families, four-end-handled surface family, genus 1 helicoid surfaces, Karcher-Scherk tower families, Scherk's second surface, saddle tower surface families, Riemann's surface family, genus 2 Riemann's surface family, infinite-ended surfaces, twisted infinite-ended surface families, periodic genus 1 helicoid family, Scherk's first surface, perturbed Scherk's first surface family, perturbed genus 1 Scherk's first surface family, first Scherk torus surface family, second Scherk torus surface family, Wohlgemuth-Thayer surface families, Karcher-Polthier-Thayer surface families. Another example of a minimal surface is the Four-Ended surface shown in FIG. 27. An optimal method for generating minimal surfaces is to enter the design parameters on a web site having a computer program compatible with a 3D printer, so that the expressed and somewhat complicated design may be physically embodied with the precise mathematical boundaries entered into the software.

As discussed above, the present invention employs minimal surfaces to provide (1) an improved random packing mass transfer device based on a minimal surface design; (2) an improved method of distillation based on random packing with a minimal surface design; (3) an improved method of absorption based on random packing with a minimal surface design; (4) an improved method of distillation based on random packing with a minimal surface design wherein greater than 10% of the surface has been removed; (5) an improved method of absorption based on random packing with a minimal surface design wherein greater than 10% of the surface has been removed.

Figure 5:
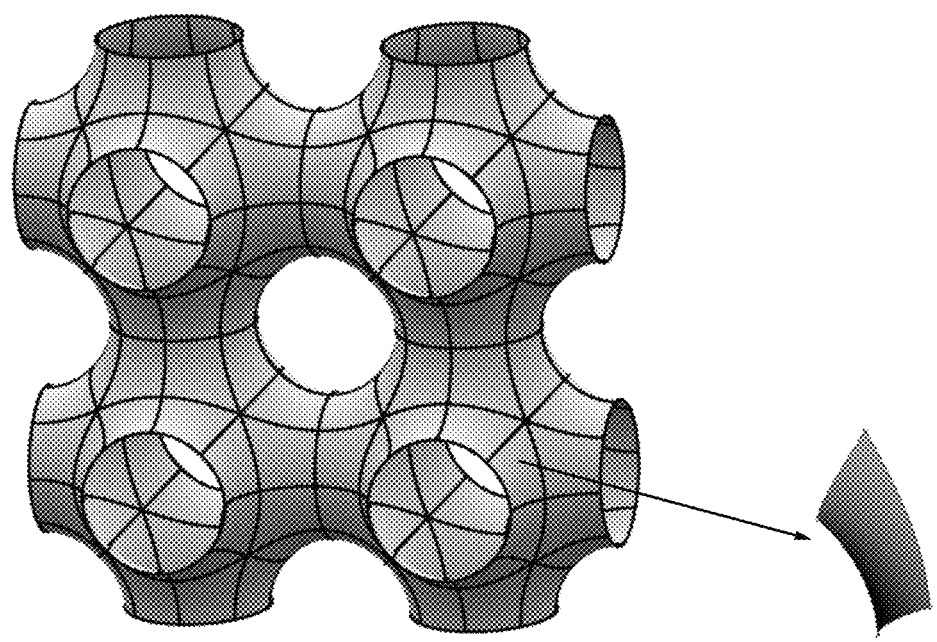
FIG. 5 is a view of Schwarz' P Surface and P Surface Fundamental Unit.

For those applications where structured packing is used as a mass transfer device there is a continuing need for an improved device with higher separation efficiency at the same or lower pressure drop. One of the shortcomings of the current structured packing devices is that the basic design of packing requires that the elements be rotated from one element to the next. This rotation provides additional mixing but this flow change from one element to the next results in additional pressure drop. An improved structured packing design would be one where there would not be a need to rotate the packing elements. The highly symmetric nature of triply periodic minimal surfaces permits this design. The surfaces are generally made by defining and evolving the fundamental region of the surface, which is usually very simple clue to the high symmetry, and then displaying many copies of it, suitably transformed. An example of a triply periodic minimal surface is the Schwarz P surface in FIG. 5 along with its fundamental region. As an illustration, the fundamental region would correspond to the wire edges of the soap film curvature example given above. Each element divides the flow in a 3 dimensional pattern and thus no rotation of the elements is needed and in addition the smooth curves of the minimal surface would result smooth transitions and in low pressure drop.

Figure 7:
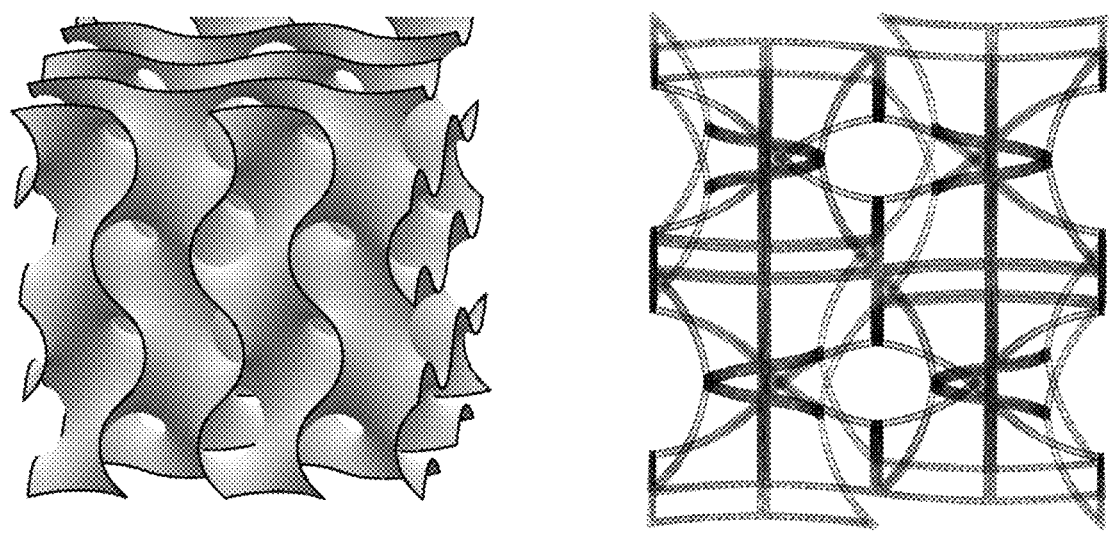
FIG. 7 is a view of Schoen's Gyroid (G) Surface and G Surface Mass Transfer Device.

To further enhance mass transfer the triply periodic surface could be modified by the addition of surface texturization. Texturization can be accomplished by use of software with specific instructions for adding dimpling to a surface in a uniform pattern of dimples on a selected surface prior to transmission to a 3D printer. Texturization improves the uniform spreading of liquid over the packing surface thus improving vapor-liquid contact and thus mass transfer within the column. In addition portions of the surface could be removed creating holes in the surface. These holes allow for intimate mixing of liquid and vapor. An example is presented in FIG. 7 based on a gyroid triply periodic minimal surface. This example presents a simple option where each fundamental unit had the same area removed. This process leaves a three-dimensional lattice where the thickness of each strut of the lattice can be optimized for balancing separation efficiency and pressure drop.

Figure 6:
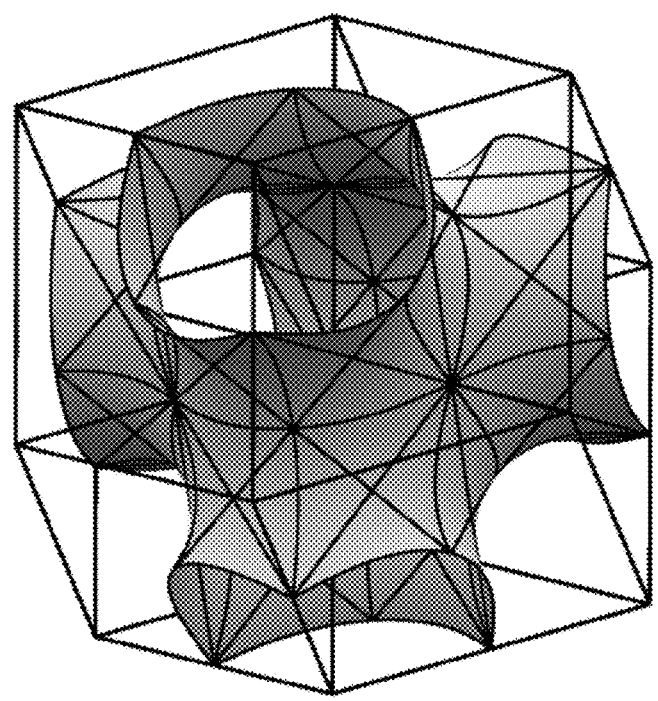
FIG. 6 is a view of Schwarz' D Surface and D Surface Mass Transfer/Heat Exchanger (with enclosing chamber removed for easier viewing)
Figure 8:
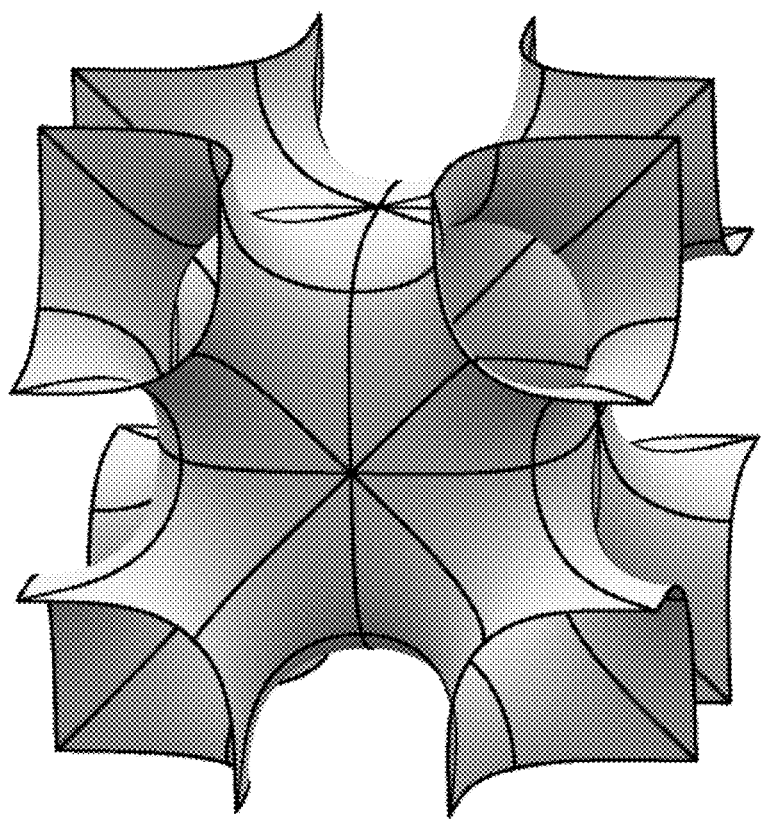
FIG. 8 is a view of Schoen's I-WP Surface.
Figure 9:
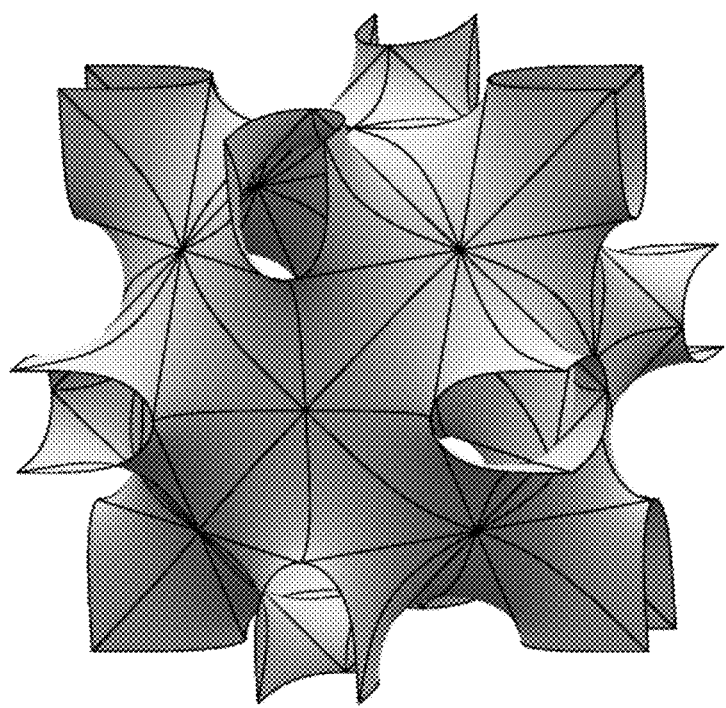
FIG. 9 is a view of Neovius' C(P) Surface.
Figure 15:
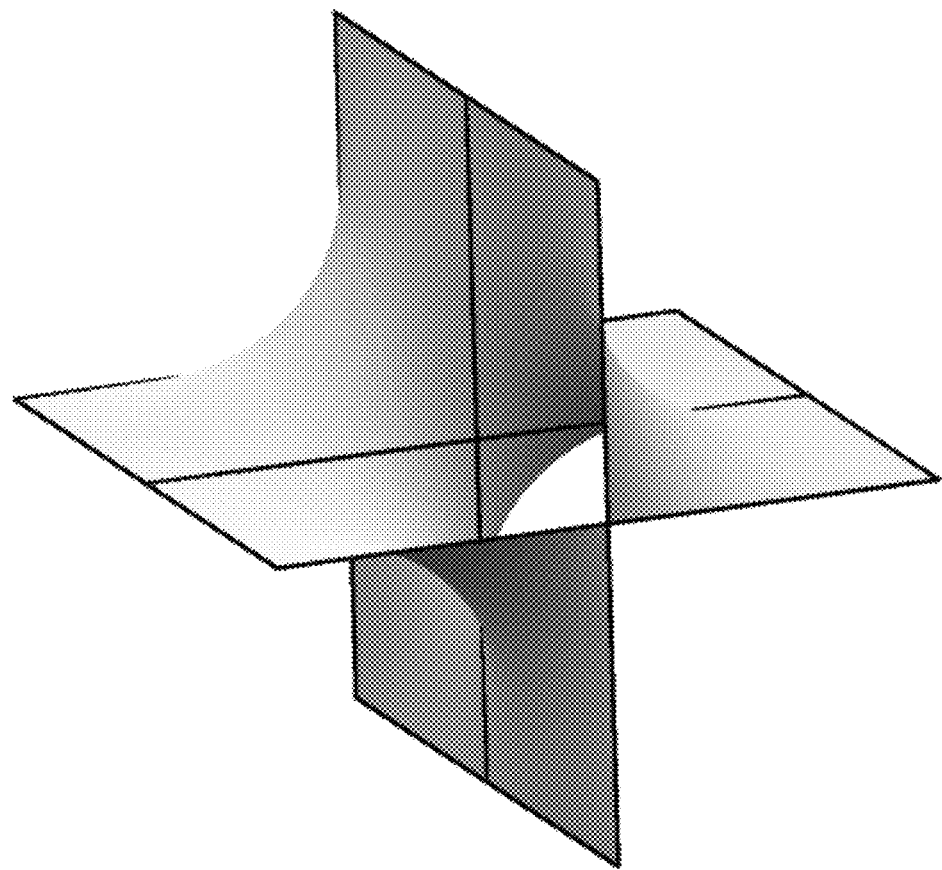
FIG. 15 is a view of Schwarz's CLP Surface.
Figure 16:
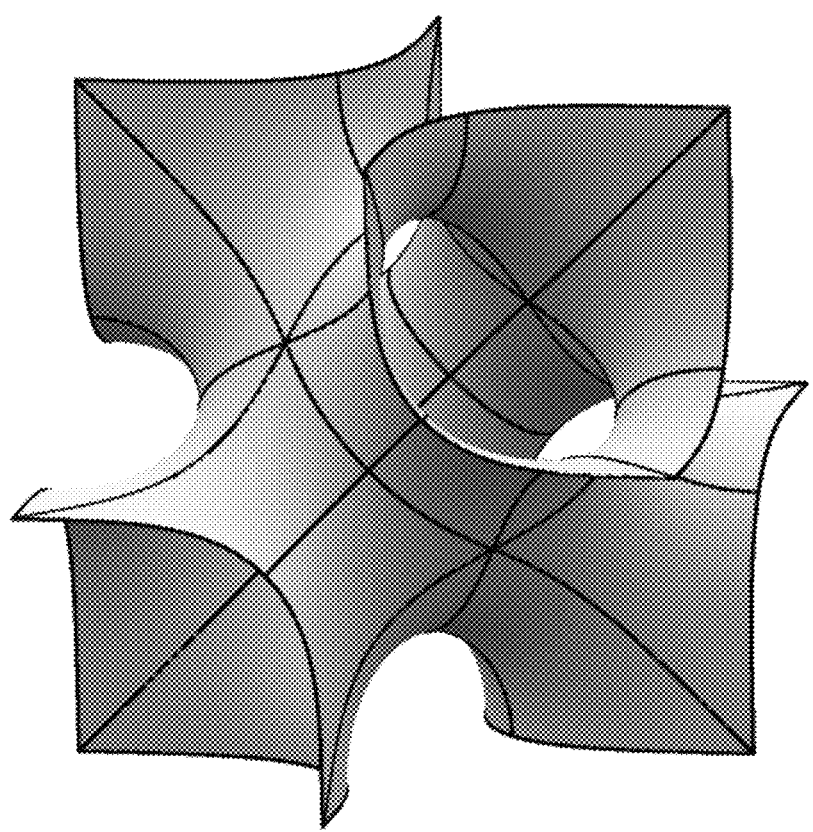
FIG. 16 is a view of Schoen's F-RD Surface.
Figure 17:
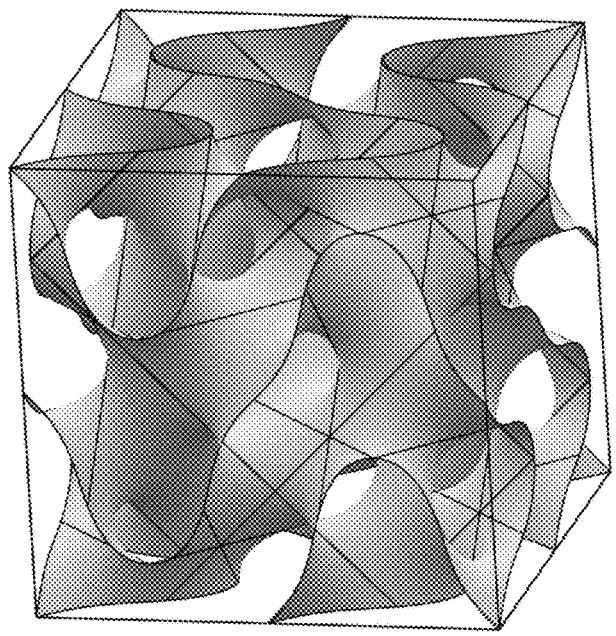
FIG. 17 is a view of a Fischer-Koch S Surface.
Figure 18:
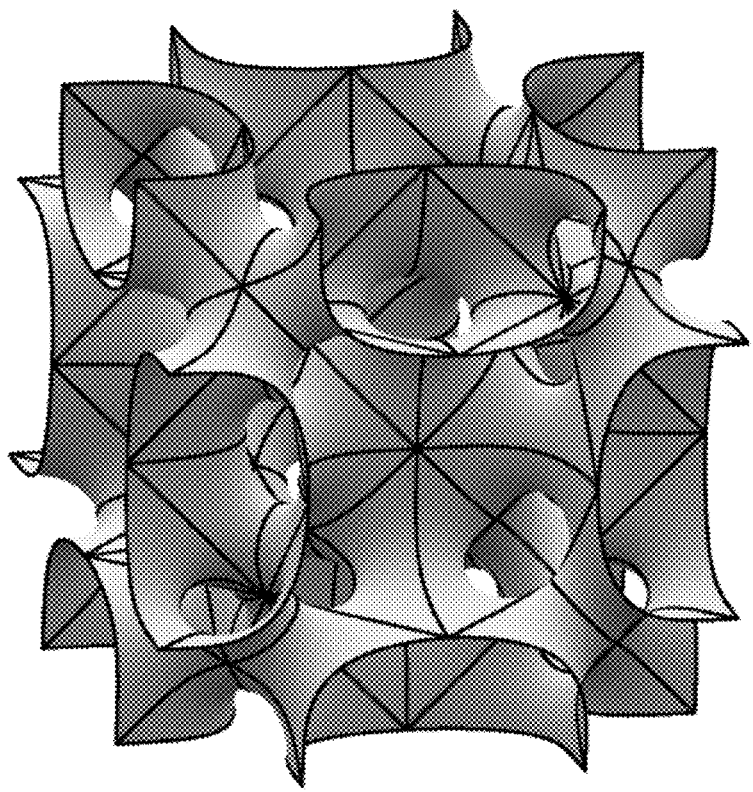
FIG. 18 is a view of Schoen's Batwing Surface.
Figure 19:
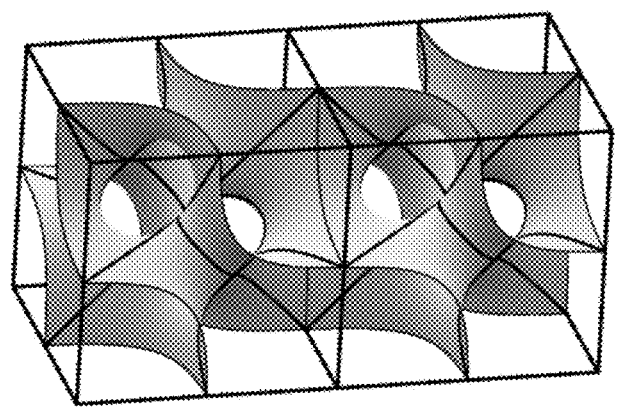
FIG. 19 is a view of Brakke's Pseudo-Batwing Surface.
Figure 20:
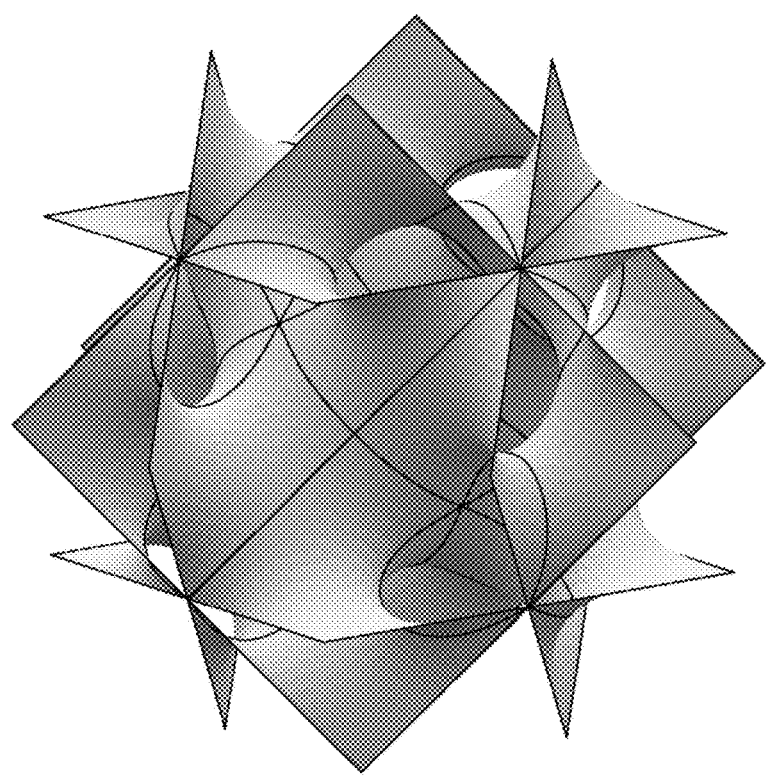
FIG. 20 is a view of a Lord and Mackay P3a Surface.
Figure 21:
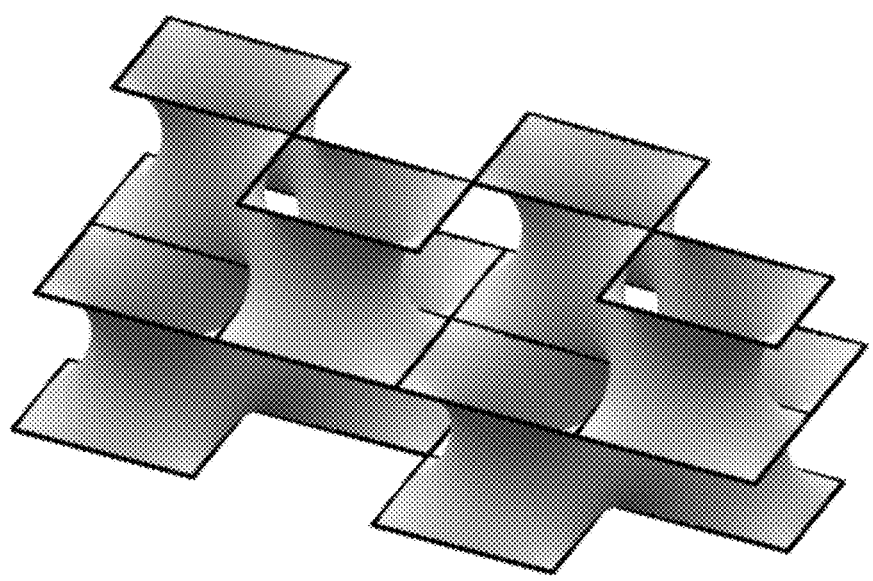
FIG. 21 is a view of Schoen's I-6 Surface.
Figure 22:
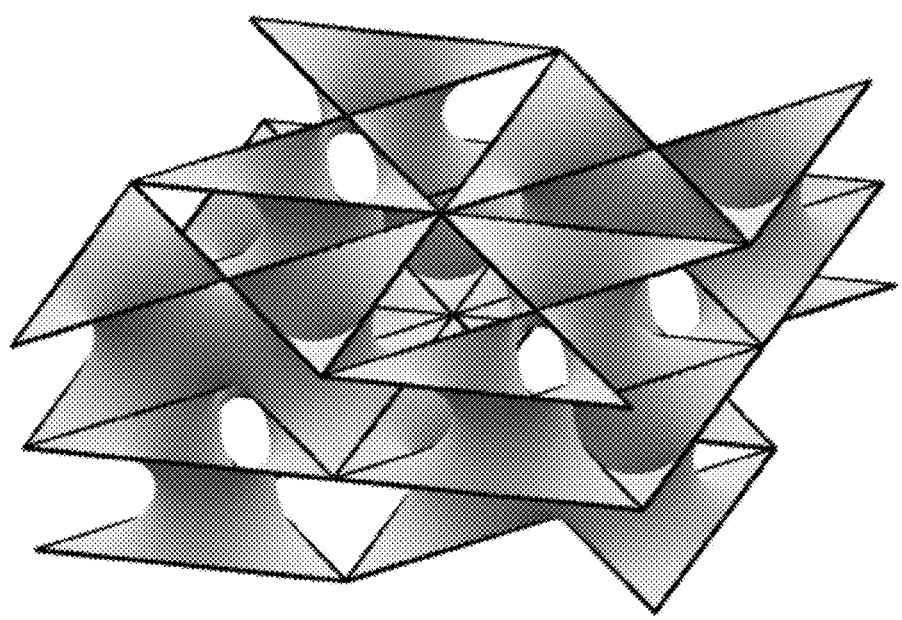
FIG. 22 is a view of Schoen's I-8 Surface.

Some triply periodic minimal surfaces suitable for mass transfer include but are not limited to: Schwarz' P Surface in FIG. 5, Schwarz' D Surface in FIG. 6, Schoen's Gyroid (G) Surface in FIG. 7, Schoen's I-WP Surface in FIG. 8, Neovius' C(P) Surface in FIG. 9, Schwarz' CLP Surface in FIG. 15, Schoen's F-RD Surface in FIG. 16, Fischer-Koch S Surface in FIG. 17, Schoen's Batwing Surface in FIG. 18, Brakke's Pseudo-Batwing Surface in FIG. 19, Lord and Mackay P3a Surface in FIG. 20, Schoen's I-6 Surface in FIG. 21, Schoen's I-8 Surface in FIG. 22, Schoen's I-9

Figure 23:
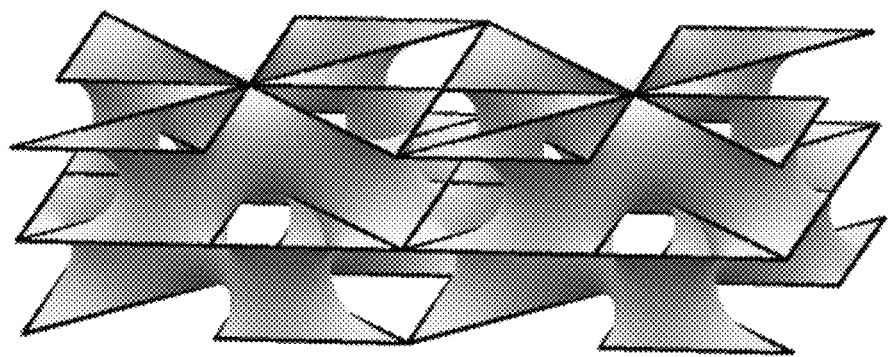
FIG. 23 is a view of Schoen's I-9 Surface.
Figure 24:
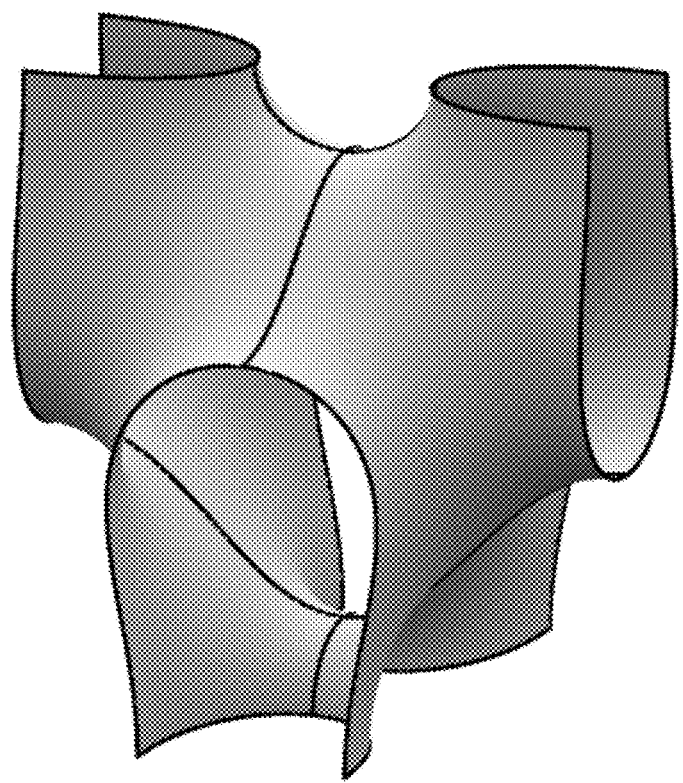
FIG. 24 is a view of Schoen's F-RD(r) Surface.
Figure 25:
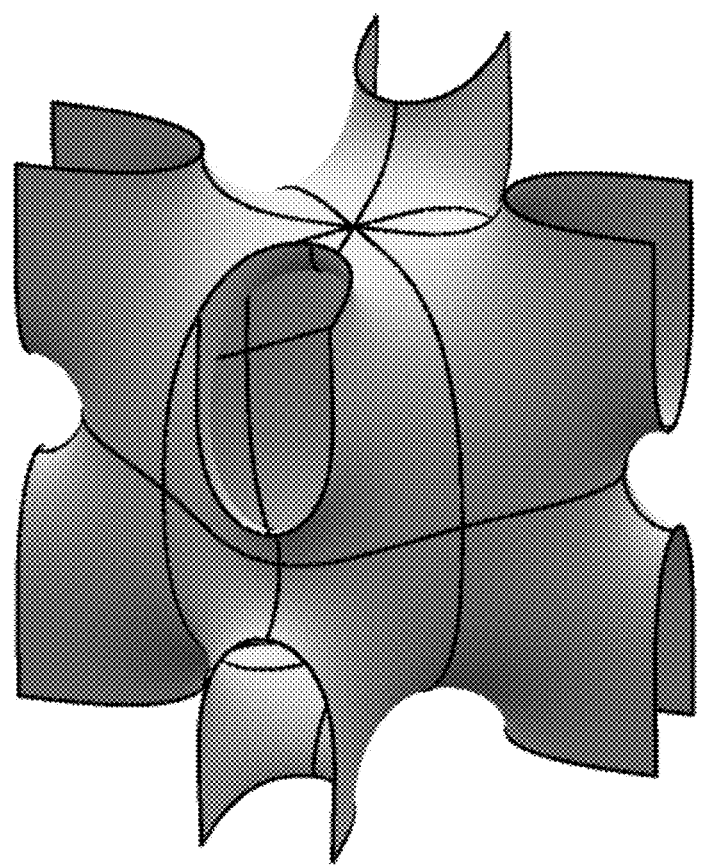
FIG. 25 is a view of Schoen's I-WP(r) Surface.
Figure 26:
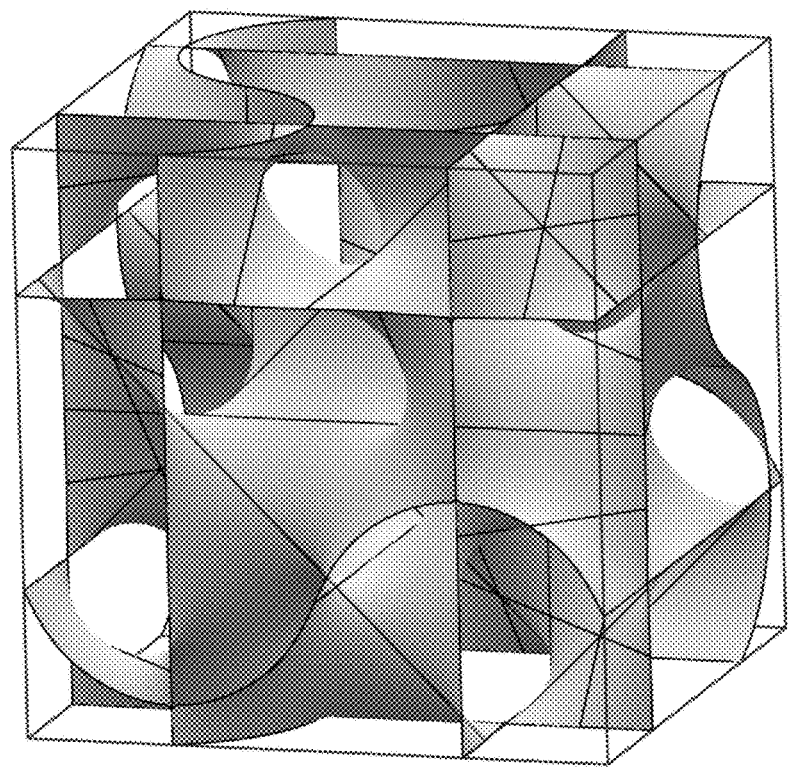
FIG. 26 is a view of a Fischer-Koch C(Y) Surface.

Surface in FIG. 23, Schoen's F-RD(r) Surface in FIG. 24, Schoen's I-WP(r) Surface in FIG. 25, Fischer-Koch C(Y) Surface in FIG. 26.

The present invention also provides (1) an improved structured packing mass transfer device based on a triply periodic minimal surface design; (2) an improved method of distillation based on structured packing with a triply periodic minimal surface design; (3) an improved method of absorption based on structured packing with a triply periodic minimal surface design; (4) an improved method of distillation based on structured packing with a triply periodic minimal surface design wherein greater than 10% of the surface has been removed; (5) an improved method of absorption based on structured packing with a triply periodic minimal surface design wherein greater than 10% of the surface has been removed. Two preferred embodiments include the Schwarz' diamond (D) surface shown in FIG. 6 and Schoen's gyroid (G) surface shown in FIG. 30.

Figure 10:
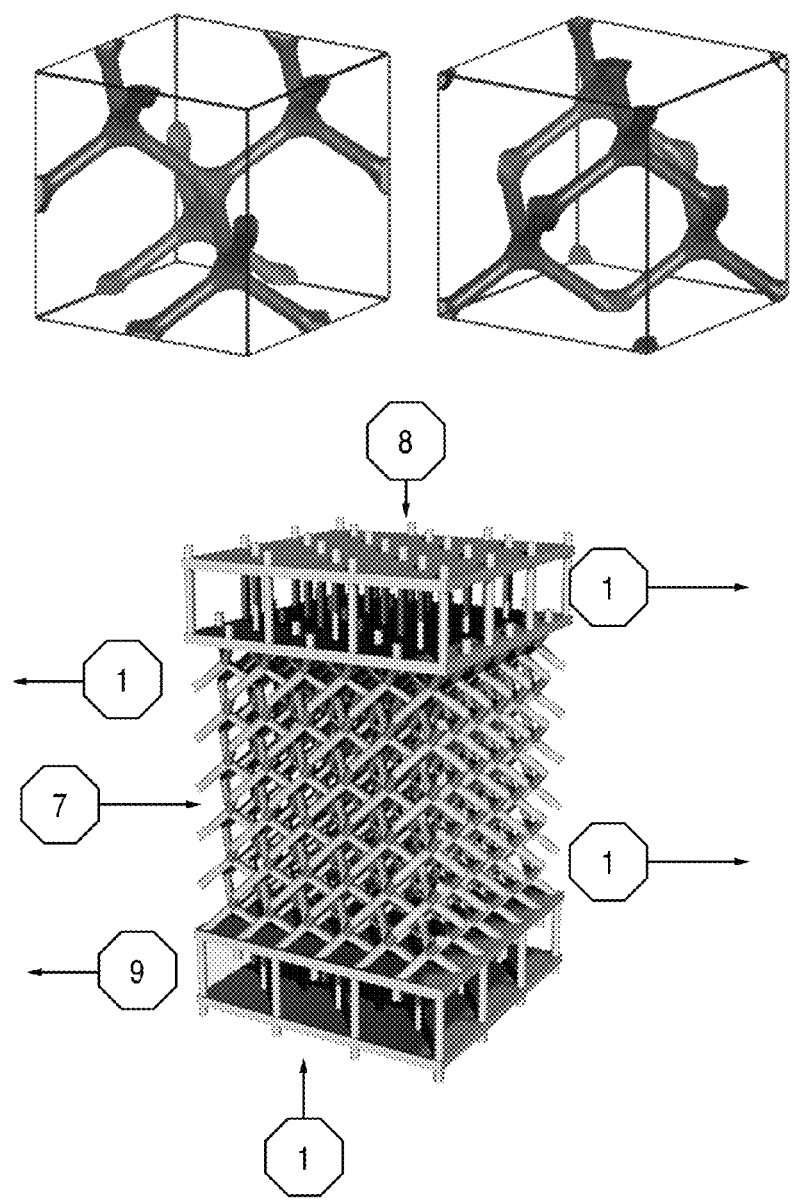
FIG. 10 is a view of Primary (left) and Secondary (right) Skeletal D (Diamond) Surface and primary and secondary Skeletal Diamond (D) Surface Mass Transfer/Heat Exchanger (with enclosing chamber removed for easier viewing)
Figure 11:
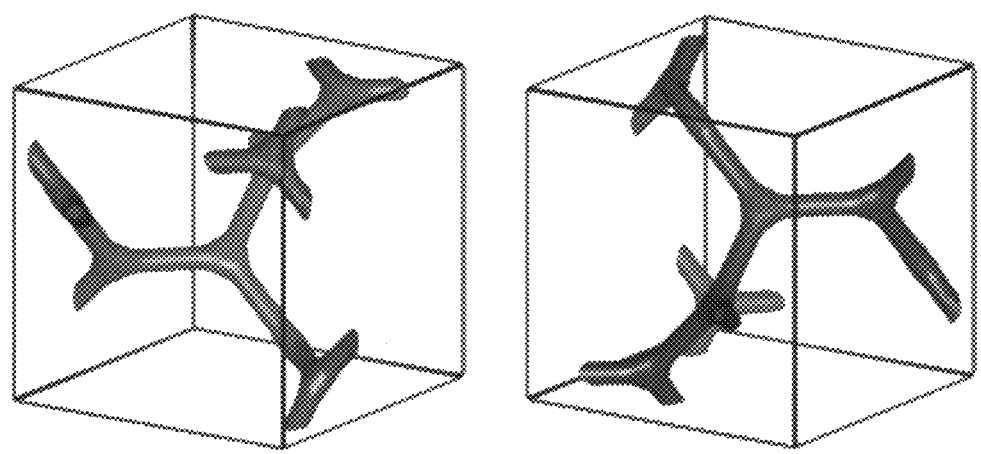
FIG. 11 is a view of Primary (left) and Secondary (right) Skeletal G (Gyroid) Surfaces.
Figure 12:
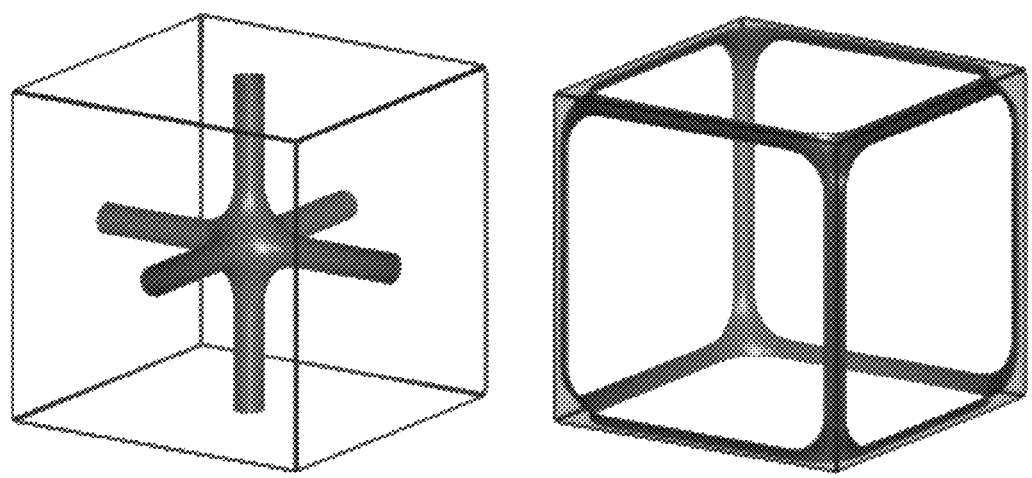
FIG. 12 is a view of Primary (left) and Secondary (right) Skeletal P Surfaces.
Figure 13:
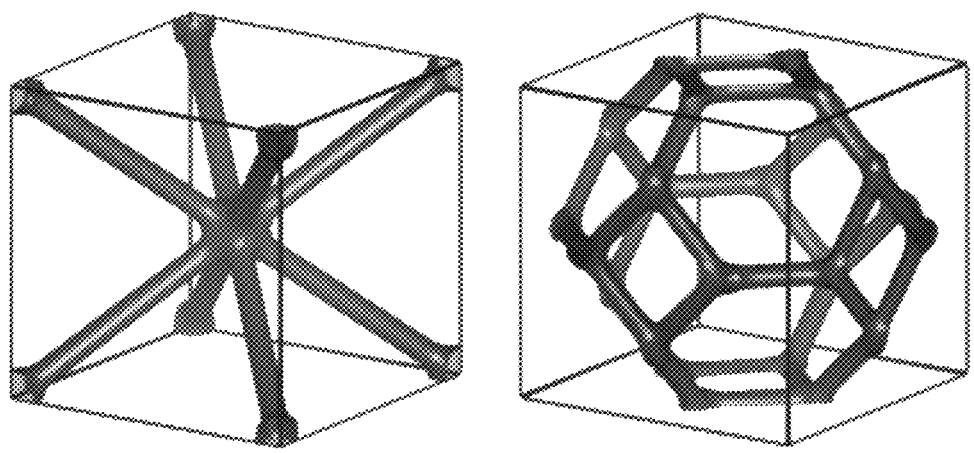
FIG. 13 is a view of Primary (left) and Secondary (right) Skeletal I-WP Surfaces.
Figure 14:
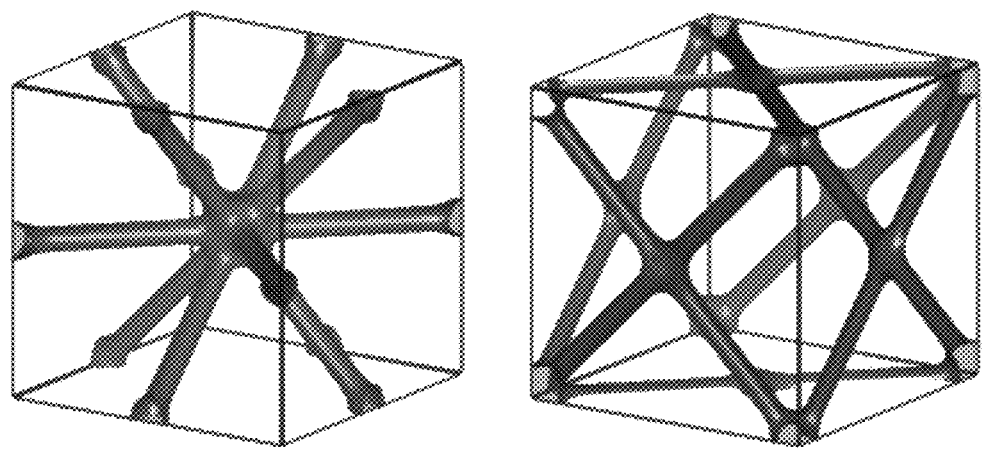
FIG. 14 is a view of Primary (left) and Secondary (right) Skeletal Neovius C(P) Surfaces.

In addition to structured packing based on triply periodic minimal surfaces described above there is a subset of these surfaces that have unique skeletal graphs and can be described with level set descriptions. These surfaces, being oriented, have two skeletal graphs, which are designated primary and secondary. Examples of triply periodic skeletal graphs are the D (diamond) in FIG. 10, G (gyroid) in FIG. 11, P in FIG. 12, I-WP in FIG. 13, and Neovius C(P) in FIG. 14. In addition to level set descriptions of skeletal minimal surface graphs simple pipes intersecting in trigonal or tetrahedral configurations can also be used to represent the gyroid and diamond skeletal graphs, respectively. To illustrate the interpenetrating networks of the skeletal graphs and the triply periodic surface an example of a gyroid (G) triply periodic minimal surface, its primary and secondary skeletal graphs with simple pipes in a trigonal configuration is presented in FIG. 30. It is understood that this is for illustrative purposes only and in fact the skeletal graphs can be made as hollow tubes such that fluids can be passed within the skeletal structures.

The interpenetrating networks of the primary and secondary skeletal graphs can be used as mass transfer mixing devices. The up and down motion of the two interpenetrated networks can be used to gently mix liquids. An example of such an agitated column is a KARR® column.

The present invention also provides (1) an improved structured packing mass transfer device based on skeletal graphs of triply periodic minimal surface design; (2) an improved method of distillation based on skeletal graphs of triply periodic minimal surface design; (3) an improved method of absorption based on skeletal graphs of triply periodic minimal surface design; (4) an improved mixing mass transfer packing that can be used in an agitated column for liquid-liquid extraction based on a primary plus secondary skeletal graph of a triply periodic minimal surface area design. Two preferred embodiments include the Schwarz' diamond (D) surface shown in FIG. 29 and Schoen's gyroid (G) surface shown in FIG. 30.

To improve the distillation energy efficiency the diabatic distillation column has shown promise but high capital costs and complex tray design has limited its commercial application. The use of pipes with the skeletal triply periodic minimal surface design (e.g. diamond skeletal graphs or gyroid skeletal graphs) would alleviate this problem because the skeletal graphs would not only be used as conduits for heat transfer fluids but also as structured packing within the distillation column and thus the need for complex tray design would be eliminated. An example with the Schwarz diamond (D) skeletal graphs is presented in FIG. 10. This example has the outer shell removed for easier visualization and solid pipes represent the tubes. Cooling fluid would be circulated within one set of pipes (an inlet pipe, 8 and an outlet pipe, 9) and heating fluid in the other (inlet pipe, 10 and outlet pipe, 11). The feed would enter the column at inlet 7, the distillate product would exit at the top at outlet 12, and the bottoms would exit the bottom at outlet 13.

The present invention also provides (1) an improved structured packing heat and mass transfer device based on primary and secondary skeletal graph tubes of triply periodic minimal surface area design; (2) an improved method of distillation based on a structured packing heat and mass transfer device based on primary and secondary skeletal graph tubes of triply periodic minimal surface area design wherein the skeletal graph tubes are hollow and act as conduits for heating and cooling fluids. Two preferred embodiments include the primary and secondary skeletal diamond (D) surface shown in FIG. 10 and the primary and secondary skeletal gyroid (G) surface.

For distillation applications where heat and a mass transfer integration uses a combination of vapor compression and diabatic distillation, a design based on a triply periodic minimal surface area surface has significant advantages over conventional designs such as those based on structured packing with plate heat exchangers or concentric shell design with trays.

Figure 28:
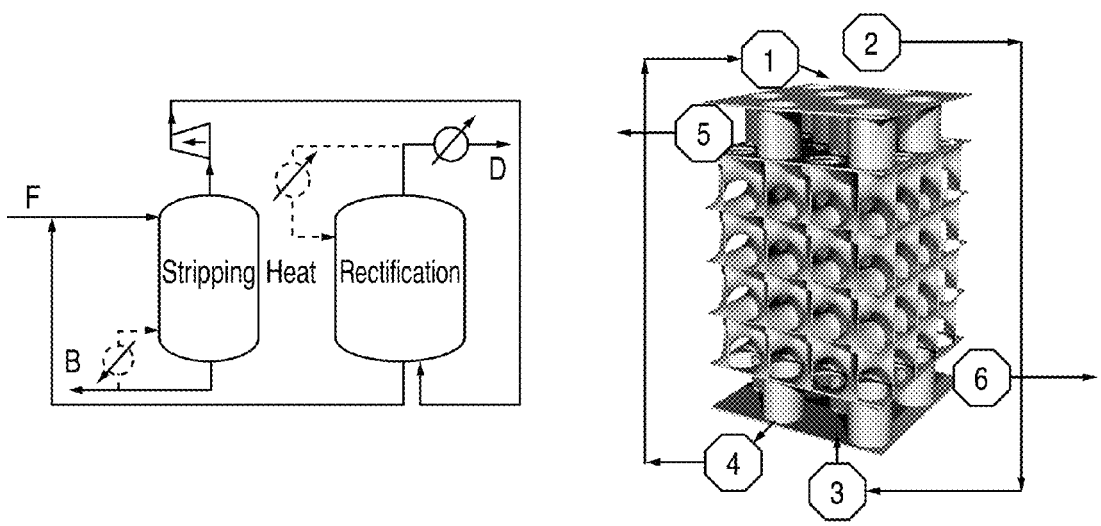
FIG. 28 is a view of a Heat Integrated Distillation Column and Schwarz' D Surface Mass Transfer/Heat Exchanger (with enclosing chamber removed for easier viewing)

An example of a triply periodic mass/heat transfer structure can be illustrated using the diamond structure, FIG. 28 with the enclosing column removed for easier viewing. On the left side of FIG. 28 is a picture of how a heat integrated column would operate. The feed, F, enters the stripping section of the column and the vapor leaving the stripping section is compressed. This compressed vapor is fed to the bottom of the rectification section that is operated at a higher pressure and thus a higher temperature than the stripping section. The heat released during continuous vapor condensation along the rectification section is used to effect approximately the same amount of progressive evaporation of liquid to maintain continuously increasing vapor traffic along the stripping section. The distillate product, D, is taken from the top of the rectification section and the bottoms, B, are taken from the bottom of the stripping section.

Using the Schwarz diamond (D) triply periodic surface as an example (right side FIG. 28) the feed, 1, enters the stripping section and the vapor, 2, is compressed and fed to the bottom of the rectification section, 3, the top of the rectification section, 5, is the distillate product while the bottoms of the rectification section, 4, are fed to the feed 1, after passing thru a pressure let down valve. The bottoms of the stripping section 6, are the bottoms product. The advantage of the triply periodic packing is that the walls between the stripping and rectification sections can be thin and strong thus enhancing the heat transfer. In addition as the fluids move from one repeating unit to the next the flow is split into multiple paths and so this flow change would result in increased turbulence and enhanced heat and mass transfer. A further benefit is that the smooth curves of the minimal surface would result in reduced pressure drop. To further enhance heat transfer the triply periodic heat transfer surface could be modified by texturing.

The present invention also provides an improved method of distillation based on triply periodic minimal surface design wherein the vapor from one section is compressed and added to the other section. Two preferred embodiments include the Schwarz' D Surface shown in FIG. 28 and Schoen's Gyroid (G) Surface.

The heat and mass transfer distillation packing previously described was based on structures constructed of a non-permeable material, such as metal. However, it is also possible to configure a separation process where the separation is due to a phase change. This distillation would employ a membrane that is nonporous such that the liquid on one side of the membrane would not mix with the liquid on the other side but the membrane would be permeable to the vapors and offer little resistance to mass transfer. One type of material that could be employed is plastic, i.e., of polymers based on the acrylate ion such as polymethyl methacrylate and polyacrylonitrile or based on polyethylene or polypropylene. This membrane distillation configuration would allow for transfer of both mass and heat across the membrane. The fluid enters one side of the membrane distillation column at a higher temperature than the fluid on the other side. For the higher temperature fluid the more volatile component enters the membrane pores as a vapor and because of the temperature difference a vapor pressure gradient is produced. At the cold or permeate side, the molecules are either condensed or removed in vapor form. The advantage of using a minimal surface derived configuration is that the can be very thin and thus increase the mass transport across the membrane.

Figure 31:
FIG. 31 is a view of a Helicoid Direct Contact Membrane Distillation.

Using the Helicoid surface as an example (FIG. 31) the heated fluid to be distilled flows, for example, in at inlet 31 and out at outlet 33, and the cold fluid flowing in a counter-current mode, for example, in at inlet 34 and out at outlet 32. This temperature difference provides the driving force for the movement of vapor from the hot stream. Between the hot and cold streams is a minimal surface membrane. The vapor is transferred from the hot stream to the cold stream. It is understood that FIG. 31 is a cutaway view such that part of the enclosing column and membrane is removed for easier viewing.

Figure 32:
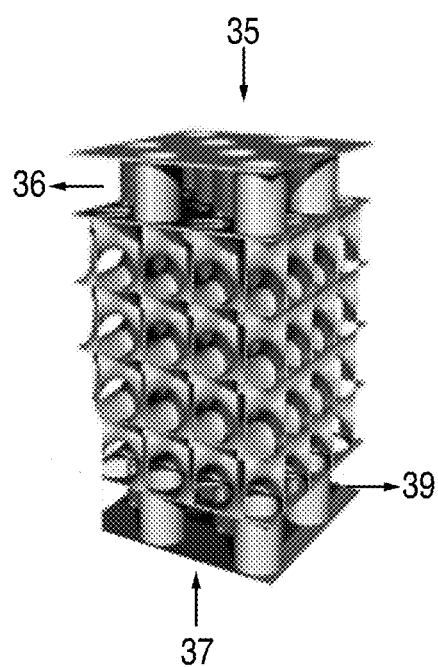
FIG. 32 is a view of a Schwarz D Surface Direct Contact Membrane Distillation.

The present invention also provides an improved method of direct contact membrane distillation based on triply periodic or a helicoid minimal surface are design where the membrane is permeable to vapor but not to liquid. Three preferred embodiments include the Schwarz' D Surface shown in FIG. 32, Schoen's Gyroid (G) Surface, and Helicoid Surface shown in FIG. 31. An example of an early direct contact membrane distillation is found in U.S. Pat. No. 3,340,186 to Welt incorporated by reference herein.

For absorption applications where heat and mass transfer integration is desired a design based on a triply periodic minimal surface area has significant advantages over conventional designs.

Using the Schwarz diamond (D) triply periodic surface as an example (left side FIG. 29) the absorption solvent, 14, enters the absorber section at the top and the gas mixture, 15, to be separated enters at the bottom. The gas that is not absorbed, 16, exits the top of the absorber while the solvent laden with the gas that was absorbed, 17, exits the bottom of the absorber. Heat is added to the gas containing solvent that is then is routed to the inlet of the stripper, 18. In the stripper the gas is removed from the solvent, 19, and produced as the concentrated gas product, 20. The solvent, 19, is recycled to the inlet, 14, of the process. This design has the advantage over conventional absorber designs because the absorber and stripper are in the same column and thus heat exchange between stripping and absorbing is enhanced. Another advantage of the triply periodic packing is that the walls between the stripping and rectification sections can be thin and strong thus enhancing the heat transfer. In addition, as the fluids move from one repeating unit to the next the flow is split into multiple paths and so this flow change would result in increased turbulence and enhanced heat and mass transfer. A further benefit is that the smooth curves of the minimal surface would result in low (i.e., reduced) pressure drop. To further enhance heat transfer the triply periodic heat transfer surface could be modified by texturing.

The present invention also provides an improved method of absorption based on triply periodic minimal surface design. Two preferred embodiments include the Schwarz' D Surface shown in FIG. 29 and Schoen's Gyroid (G) Surface.

Figure 29:
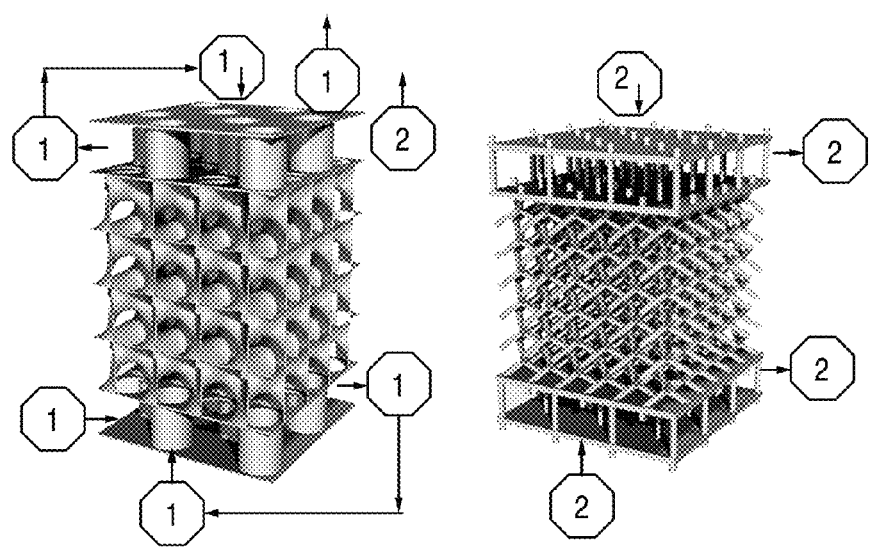
FIG. 29 is a view of Schwarz' D Surface Absorber Column and (with enclosing column removed for easier viewing) and primary and secondary Skeletal Diamond (D) Surface Heat Exchangers.
Figure 30:
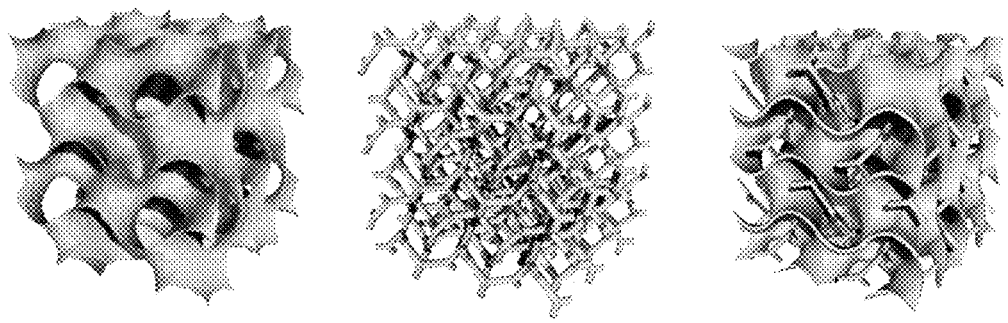
FIG. 30 is a view of Schoen G Surface, primary and secondary Skeletal Gyroid (G) graphs, and combination of G surface with primary and secondary Skeletal graphs.

A further improvement in absorber can be realized by incorporating heating and cooling tubes within the triply periodic minimal surface area design. Using the Schwarz diamond (D) triply periodic surface as an example (right side FIG. 29) a cooling fluid, if needed, can be added to the absorber section with the cooling inlet 21; and outlet 22 and heat added to the absorber section with the heat inlet 23 and outlet 24. It should be noted that the right and left pictures of FIG. 29 are for illustrative purposes only and that the solid pipes represent hollow tubes. An illustration of how the primary and secondary skeletal graphs can be integrated into a triply periodic gyroid (G) minimal surface is shown in FIG. 30. The advantage of this design is that heat and cooling can be gradually added to the stripper and absorber thus minimizing heat losses. In addition the inclusion of skeletal graphs in the stripper and absorber further enhances the turbulence within the stripper and absorber thus improving the mass transfer between the gas and solvent.

The present invention also provides an improved method of absorption based on triply periodic minimal surface design with skeletal graphs as heat transfer devices. Two preferred embodiments include the Schwarz' diamond (D) surface with its skeletal graphs shown in FIG. 29 and Schoen's gyroid (G) surface with its skeletal graphs shown in FIG. 30.

The skeletal graph heat and mass transfer packing previously described was based on tubes constructed of a non-permeable material, such as metal, the tubes carrying the heat transfer fluids wherein there was exchange of heat but no mass transfer to the material being distilled. However, there is another design wherein the tubes are membranes. The composition would be nonporous such that the liquid would be contained within the tubes but be permeable to the vapors and offer little resistance to mass transfer. One type of material that could be employed is plastic, i.e., of polymers based on the acrylate ion such as polymethyl methacrylate and polyacrylonitrile or based on polyethylene or polypropylene. This membrane distillation configuration would allow for transfer of both mass and heat across the membrane.

In one embodiment both sets of tubes contain the fluid to be distilled. In one set of tubes the fluid enters the distillation column at a higher temperature than the fluid in the other set of tubes. For the higher temperature fluid the more volatile component enters the membrane pores as a vapor and because of the temperature difference a vapor pressure gradient is produced. At the cold or permeate side, the molecules are either condensed or removed in vapor form. The advantage of using a minimal surface derived configuration is that the skeletal graphs can be manufactured where the distance between the two sets of tubes can be extremely small so that the pressure gradient driving force and therefore efficiency is increased. In addition because of the minimal surface area design the membrane can be very thin. Although the described configuration can be considered an air gap type of membrane distillation, other types of membrane distillation configurations such as vacuum, sweeping gas, or vacuum multi-effect membrane distillation are also considered part of this invention.

The present invention also provides an improved structured packing heat and mass transfer device based on primary and secondary skeletal graph tubes of triply periodic minimal surface area design wherein the tubes are composed of a permeable material such as polyethylene or polypropylene or polymethylmethacrylate plastic composites. The invention also provides an improved method of membrane distillation based on primary and secondary skeletal graph tubes of triply periodic minimal surface area design wherein the tubes are composed of a permeable material. Two preferred embodiments include the primary and secondary skeletal diamond (D) surface shown in FIG. 29 and the primary and secondary skeletal gyroid (G) surface shown in FIG. 30.

Figure 4:
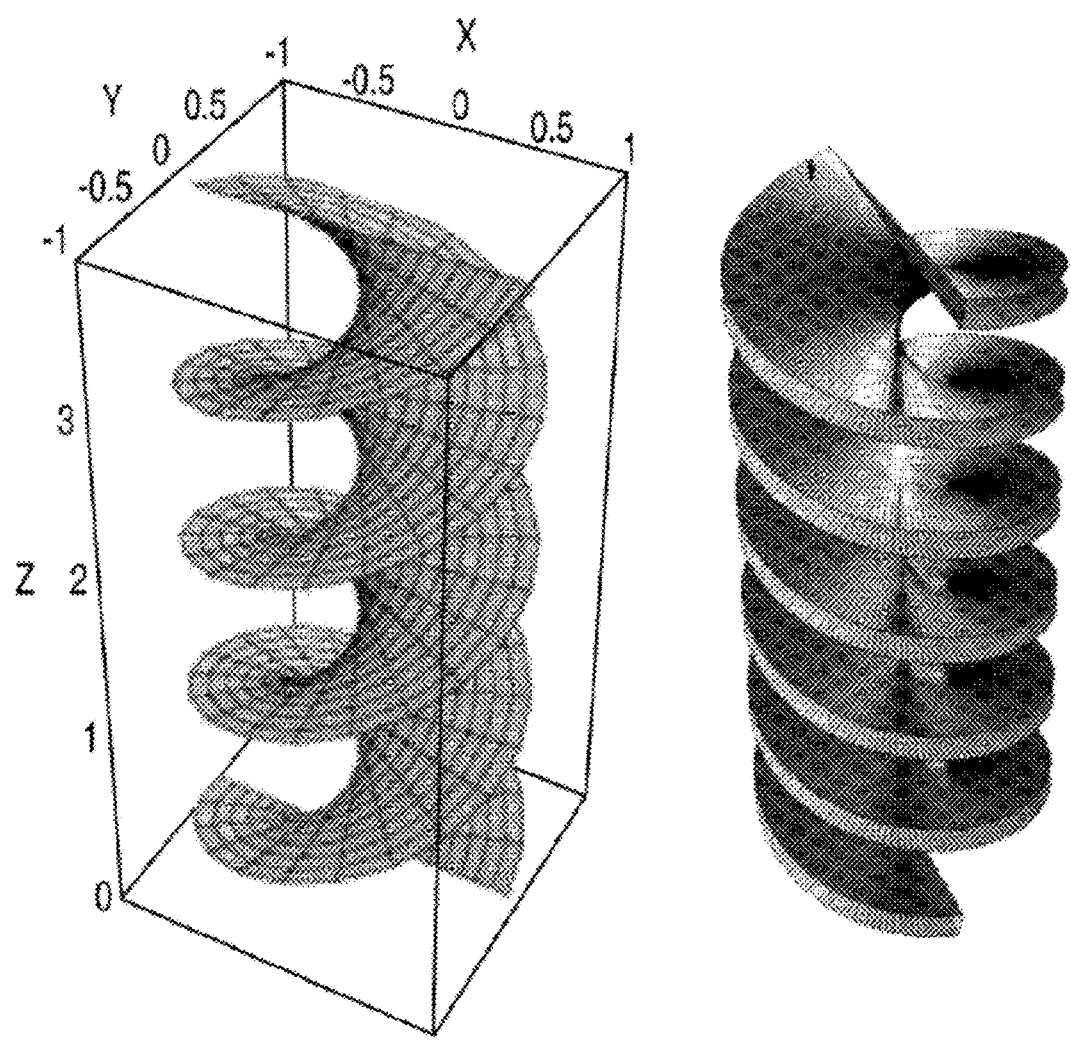
FIG. 4 is a view of a Helicoid and Double Helicoid (with enclosing chamber removed for easier viewing)

The present invention also provides a structured packing heat and mass transfer device based on a double helicoid of tubes wherein the tubes are composed of a permeable material such as polyethylene or polypropylene or polymethylmethacrylate plastic composites. A membrane distillation using a double helicoid can be seen in FIG. 4. It is understood that the enclosing column is removed for easier viewing. One helicoid would have the heated fluid to be distilled flowing, for example, in at inlet 25 and out at outlet 26, and the cold fluid flowing in a counter-current mode, for example in at inlet 27 and out at outlet 28. This temperature difference provides the driving force for the movement of vapor from the hot stream. Between the hot and cold streams is a gap that can be very small and provides a location to capture the distillate product 29 and bottoms product 30. The invention also provides an improved method of membrane distillation based on a double helicoid of tubes wherein the tubes are composed of a permeable material.

Use of energy recovery ventilation systems (ERV) is becoming increasingly more important due to the high cost of energy. Recent advances have included membranes that not only transfer sensible heat but also latent heat. The typical configuration is in a crosscurrent countercurrent air to air heat exchanger built with a humidity permeable material. Minimal surface area heat exchangers are particularly efficient for this application because their thin but strong design allows for efficient heat transfer.

Thus the invention also provides an energy recovery ventilation system based on a triply periodic minimal surface or a helicoid minimal surface, FIG. 31, with a humidity permeable membrane. Preferred triply periodic surfaces include diamond (D) shown in FIG. 32 and gyroid (G).

The following are illustrations of practical applications of minimal surface area materials: A minimal surface area can be used in a method for carrying out distillation by passing vapor and liquid countercurrently in a column containing packing comprising a material described as a skeletal graph of a triply periodic minimal surface where the skeletal graphs are hollow conduits for heat transfer fluids.

A minimal surface area can be used in a mass transfer device based on a double helicoid where the tubes are composed of a permeable material.

For membrane distillation, a system may include: a distillation vessel defining a distillation volume having a first portion and a second portion; a pump for delivering feed solution to the array of hollow fiber membranes; an array of hollow fiber membranes in a double helicoid configuration extending through the distillation volume, wherein the hollow fiber membranes are pervious to distillate vapor but impervious to feed solution and a heating heat exchanger for heating feed solution before it enters one of the helicoid hollow fiber membranes; a cooling heat exchanger for cooling feed solution after it enters one of the helicoid hollow fiber membranes; and an outlet for removing distillate from the distillation vessel.

Another embodiment of a membrane distillation system may include: a distillation vessel defining a distillation volume having a first portion and a second portion; a pump for delivering feed solution to the array of hollow fiber membranes; an array of hollow fiber membranes in a primary and secondary triply periodic skeletal graphs configuration extending through the distillation volume, wherein the hollow fiber membranes are pervious to distillate vapor but impervious to feed solution and a heating heat exchanger for heating feed solution before it enters one of the triply periodic skeletal graph hollow fiber membranes; a cooling heat exchanger for cooling feed solution after it enters one of the triply periodic skeletal graph hollow fiber membranes; an outlet for removing distillate from the distillation vessel.

A minimal surface area may be used in a method of separating a product gas from a mixed gas stream in a continuous cyclic sorption-desorption process by contacting the gas stream with a circulating stream of a liquid sorbent medium in a gas/liquid sorption zone having a triply periodic minimal surface under conditions, including a sorption temperature, to form a rich solution of product gas sorbed in the liquid sorbent medium; passing the rich solution of product gas sorbed in the liquid sorbent medium to a desorption/regeneration zone comprising a triply periodic minimal surface in which product gas is desorbed from the rich solution in the liquid sorbent medium under conditions required for desorption of the product gas, including a desorption temperature, to form product gas as an effluent and a lean, regenerated sorbent medium having a reduced product gas concentration; and passing the resulting regenerated lean sorbent medium with reduced product gas concentration to the sorption zone.

A minimal surface may also be used in humidifying/dehumidifying an air stream by exchanging the energy contained in normally exhausted building or space air and using it to treat (precondition) the incoming outdoor ventilation air with a triply periodic minimal surface heat exchanger with a humidity permeable membrane.

Another application is for distillation by passing vapor and liquid countercurrently in a column containing packing comprising a material described as a skeletal graph of the triply periodic diamond (D) minimal surface.

Another application is for distillation by passing vapor and liquid countercurrently in a column containing packing comprising a material described as a skeletal graph of the triply periodic gyroid (G) minimal surface.

A minimal surface area is also useful for separating a product gas from a mixed gas stream in a continuous cyclic sorption-desorption process which includes contacting the gas stream with a circulating stream of a liquid sorbent medium in a gas/liquid sorption zone comprising a triply periodic minimal surface with its associated skeletal graphs as heat transfer devices under conditions, including a sorption temperature, to form a rich solution of product gas sorbed in the liquid sorbent medium; passing the rich solution of product gas sorbed in the liquid sorbent medium to a desorption/regeneration zone comprising a triply periodic minimal surface with its associated skeletal graph as heat transfer devices in which product gas is desorbed from the rich solution in the liquid sorbent medium under conditions required for desorption of the product gas, including a desorption temperature, to form product gas as an effluent and a lean, regenerated sorbent medium having a reduced product gas concentration; and passing the resulting regenerated lean sorbent medium with reduced product gas concentration to the sorption zone.

Another distillation application is carried out by passing vapor and liquid countercurrently in a column containing packing comprising a material with a minimal surface area wherein greater than 10% of the surface has been removed. Another is by passing vapor and liquid countercurrently in a column containing packing comprising a material with a triply periodic minimal surface area wherein greater than 10% of the surface has been removed. Variations on the triply periodic minimum surface include a surface area described as the diamond (D) surface wherein the vapor from one section is compressed and added to the other section, and a triply periodic minimal surface described as the gyroid (G) surface wherein the vapor from one section is compressed and added to the other section.

Another application is mixing by passing liquids countercurrently in an agitated column containing structured packing comprising a material based on a primary plus secondary skeletal graph of a triply periodic minimal surface area design. The packing may be (a) the skeletal graph of the triply periodic diamond (D) minimal surface; (b) the skeletal graph of the triply periodic gyroid (G) minimal surface; (c) the skeletal graph of the triply periodic diamond (D) minimal surface; (d) the skeletal graph of the triply periodic gyroid (G) minimal surface. The triply periodic minimal surface and associated skeletal graph may be of the diamond (D) minimal surface type, the gyroid (G) minimal surface. The packing may be the triply periodic diamond (D) minimal surface or the triply periodic gyroid (G) minimal surface. The gas/liquid sorption zone and the desorption/regeneration zone may have the minimal surface described as a diamond (D) minimum surface, or as a gyroid (G) minimum surface. Distillation may also be carried out by passing vapor and liquid countercurrently in a column containing packing comprising a material with a triply periodic minimal surface area where the vapor from one section is compressed and added to the other section.

Since other modifications or changes will be apparent to those skilled in the art, there have been described above the principles of this invention in connection with specific apparatus, it is to be clearly understood that this description is made only by way of example and not as a limitation to the scope of the invention.

What is claimed is:
1. A mass transfer packing unit, comprising:
an inlet for receiving a fluid disposed on a first side of a mass transfer column;
an outlet for discharging a product disposed on a second side of the mass transfer column, wherein the first side and the second side define opposite ends of the mass transfer column; and
a minimal surface area material located between the inlet and the outlet;
the minimal surface area material having a minimal surface area;
the minimal surface area having a mean curvature of zero at each point on the minimal surface area;
the minimal surface area material being in fluid communication with the inlet and the outlet for processing the fluid into the product.

2. The mass transfer packing unit of claim 1, wherein the minimal surface area material comprises a triply periodic minimal surface area.

3. The mass transfer packing unit of claim 2, wherein the triply periodic minimal surface area comprises a diamond triply periodic minimal surface area.

4. The mass transfer packing unit of claim 3, wherein the diamond triply periodic minimal surface area comprises a Schwarz' diamond (D) triply periodic minimal surface area.

5. The mass transfer packing unit of claim 2, wherein the triply periodic minimal surface area comprises a gyroid triply periodic minimal surface area.

6. The mass transfer packing unit of claim 5, wherein the gyroid triply periodic minimal surface area comprises a Schoen's gyroid (G) triply periodic minimal surface area.

7. The mass transfer packing unit of claim 2, wherein the triply periodic minimal surface area partitions space within the outer boundaries of the triply periodic minimal surface area into two labyrinthine regions.

8. The mass transfer packing unit of claim 2, wherein the triply periodic minimal surface area has cubic symmetry.

9. The mass transfer packing unit of claim 1, wherein the mass transfer packing unit further comprises a helicoid, the helicoid having a tube composed of a permeable material in fluid communication with the inlet and the outlet.

10. The mass transfer packing unit of claim 9, wherein the helicoid is disposed between the inlet and the outlet.

11. A mass transfer packing unit, comprising:
an inlet for receiving a fluid;
a minimal surface area material located between the inlet and the outlet;
the minimal surface area material having a minimal surface area;
the minimal surface area having a mean curvature of zero at each point on the minimal surface area;
the minimal surface area material being in fluid communication with the inlet and the outlet for processing the fluid into the product; and
a double helicoid, the double helicoid having a tube composed of a permeable material in fluid communication with the inlet and the outlet.

12. A mass transfer packing unit, comprising:
an inlet for receiving a fluid disposed on a first side of a mass transfer column;
an outlet for discharging a product disposed on second side of the mass transfer column, wherein the first side and the second side define opposite ends of the mass transfer column;
a volume located within the mass transfer packing unit;
a minimal surface area material located between the inlet and the outlet,
the minimal surface area material having a minimal surface area;
the minimal surface area having a mean curvature of zero at each point on the minimal surface area;
the minimal surface area material dividing the volume into a first and a second interpenetrating network; and
the minimal surface area material being in fluid communication with the inlet and the outlet for processing the fluid into the product.

13. The mass transfer packing unit of claim 12, wherein the minimal surface area material comprises a triply periodic minimal surface area.

14. The mass transfer packing unit of claim 12, wherein the fluid passes through the minimal surface area material from the first interpenetrating network to the second interpenetrating network.

15. The mass transfer packing unit of claim 12, wherein the fluid passes through the minimal surface area material between the first interpenetrating network and the second interpenetrating network.

* * * * *

UNITED STATES PATENT AND TRADEMARK OFFICE
CERTIFICATE OF CORRECTION

PATENT NO. : 9,440,216 B2
APPLICATION NO. : 13/815687
DATED : September 13, 2016
INVENTOR(S) : Robert C. Ryan Page 1 of 1

It is certified that error appears in the above-identified patent and that said Letters Patent is hereby corrected as shown below:

Claims

Claim 11 at Column 16, After Line 27: Please insert --an outlet for discharging a product;--.

Claim 12 at Column 16, Line 44: Please change "disposed on second" to --disposed on a second--.

Signed and Sealed this
Thirteenth Day of December, 2016

Michelle K. Lee
*Director of the United States Patent and Trademark Office*